(12) United States Patent
Yang et al.

(10) Patent No.: US 8,046,202 B1
(45) Date of Patent: Oct. 25, 2011

(54) GENERATION OF INTERMEDIATE REPRESENTATIONS BASED ON USER SPECIFIED ELEMENTS IN A GRAPHICAL MODEL THAT ENABLE SIMULATION, PROPAGATION AND CODE GENERATION

(75) Inventors: Dongzhe Yang, Sudbury, MA (US); Robert O. Aberg, South Grafton, MA (US); Pieter J. Mosterman, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 973 days.

(21) Appl. No.: 11/487,727

(22) Filed: Jul. 17, 2006

(51) Int. Cl.
*G06F 9/44* (2006.01)
*G06F 9/45* (2006.01)
*G06G 7/48* (2006.01)

(52) U.S. Cl. .............................. 703/6; 717/106; 717/136

(58) Field of Classification Search ...... 703/6; 717/106, 717/118, 124, 131, 132, 136, 140, 141, 148, 717/155, 156
See application file for complete search history.

(56) References Cited

U.S. PATENT DOCUMENTS

| | | | |
|---|---|---|---|
| 6,233,733 B1 * | 5/2001 | Ghosh | 717/118 |
| 7,509,244 B1 * | 3/2009 | Shakeri et al. | 703/7 |
| 7,516,441 B2 * | 4/2009 | Hamilton et al. | 717/110 |
| 2005/0257195 A1 * | 11/2005 | Morrow et al. | 717/109 |
| 2009/0013307 A1 * | 1/2009 | Raghavan et al. | 717/106 |

* cited by examiner

*Primary Examiner* — Jason Proctor
*Assistant Examiner* — Andre Pierre Louis
(74) *Attorney, Agent, or Firm* — Nelson Mullins Riley & Scarborough LLP

(57) ABSTRACT

The present invention provides for converting a user-specified element of a graphical model into at least one intermediate representation that represents the user-specified element. An intermediate representation of the present invention may support simulation, propagation, and/or code generation. An element for a graphical model is provided, and the element and/or the graphical model are converted into an intermediate representation that may represent algorithmic aspects of the element or that is capable of being simulated and/or capable allowing propagation. The present invention allows a user to provide a single code for a user-specified element that may be used to support simulation, propagation and/or code generation of an element or graphical model.

42 Claims, 24 Drawing Sheets

GENERATION OF INTERMEDIATE REPRESENTATIONS BASED ON USER SPECIFIED ELEMENTS IN A GRAPHICAL MODEL THAT ENABLE SIMULATION, PROPAGATION AND CODE GENERATION

FIELD OF THE INVENTION

The present invention relates to generating an intermediate representation of elements in a graphical model. The intermediate representation is capable of being simulated and/or can enable propagation of data and model characteristics. The intermediate representation can be used for code generation.

BACKGROUND OF THE INVENTION

Graphical modeling has spawned a variety of software products such as Simulink® from The MathWorks, Inc. of Natick, Mass., that cater to various aspects of dynamic system analysis and design. Such products allow users to perform various types of tasks including constructing system models through a user-interface that allows drafting block diagram models, allowing augmentation of a pre-defined set of elements with custom user-specified elements, the use of the block diagram model to compute and trace the temporal evolution of the dynamic system's outputs ("executing" the block diagram), and automatically producing either deployable software systems or descriptions of hardware systems that mimic the behavior of either the entire model or portions of it (referred to herein as "code generation"). Each of the tasks listed above has many intricate details and subtle variations.

Graphical modeling environments allow developers to create an element for a graphical model using a computer language to describe the element. A developer may have direct access to the source code of the graphical modeling environment and may be able to create user-specified elements to implement a functionality desired by the developer or in some cases an application program interface (API) may be provided. For example, Simulink® provides an API that allows S-functions to be written in C, C++, Ada, Fortran, or MATLAB® from The MathWorks, Inc. of Natick, Mass. S-functions use a special calling syntax that enables a user to interact with Simulink®. The form of an S-function is very general and can accommodate continuous, discrete, and hybrid systems. As such, S-functions allow a user to add their own elements to a block diagram model.

Conventionally, graphical modeling environments burden developers of elements by requiring a developer to write a first set of code to support simulation of an element and a second, separate set of code to support code generation for the element. While the two independent implementations are robust, they impose a large amount of work upon developers for implementing both simulation and code generation and maintaining their consistency. In addition, simulation is typically performed based on an in-memory representation of the model that is structured based on the elements that are present in the model. This is inconvenient for simulation since optimizations across elements of a graphical model cannot be achieved. Further, the in-memory representation of the model behavior may be unduly burdened with the graphical structure of connected elements. Graphical modeling environments also burden developers of elements by requiring a developer to write methods to support propagation of compiled information of elements.

Given the above, there is a need for the ability to have a single code for an element that supports simulation and code generation. The single code may also support propagation of data and model characteristics. That is, it is a desire to enable creation of one element that can directly support simulation, propagation and code generation.

SUMMARY OF THE INVENTION

To address the above described limitations of conventional graphical modeling environments, embodiments of the present invention provide for converting a user-specified element of a graphical model into at least one intermediate representation that represents the user-specified element. In one embodiment, an intermediate representation may support simulation. In other embodiments, an intermediate representation may also support code generation. Embodiments of the present invention allow a user to provide a single code for a user-specified element that may be used to support simulation and/or code generation of the element. In other embodiments, the intermediate representation can be used to support propagation of data and/or model characteristics of elements in a graphical model. Embodiments of the present invention also enable model checking and test vector generation.

In one aspect of the present invention, a method in a graphical modeling environment is disclosed. The method includes the step of converting two or more elements of a graphical model to an intermediate representation capturing underlying computations of the at least two elements, the intermediate representation being capable of being simulated. The method further includes the step of simulating the at least two elements by executing the intermediate representation.

In another aspect of the present invention, a system in a graphical modeling environment is disclosed. The system includes a graphical modeling environment, a model comprising two or more elements, an intermediate representation of the two or more elements and a simulator. The two or more elements, the intermediate representation representing underlying computations of the at least two elements. The simulator for simulating at least a portion of the model by executing the intermediate representation.

In yet another aspect of the present invention, a medium that holds instructions that are executable on a computing device is disclosed. The instructions enable the step of converting two or more elements of a graphical model to an intermediate representation capturing underlying computations of the at least two elements. The intermediate representation is being capable of being simulated. The instructions enable the step of simulating the at least two elements by executing the intermediate representation.

In yet another aspect of the present invention, a method in a graphical modeling environment is disclosed. The method includes the step of converting two or more elements of a graphical model to a first intermediate representation capturing underlying computations of the at least two elements. The intermediate representation is capable of being simulated. The method further includes the step of propagating at least one of data or model characteristics of the at least two elements using the intermediate representation.

In still another aspect of the present invention, a medium that holds instructions that are executable on a computing device is disclosed. The instructions enable the step of converting two or more elements of a graphical model to a first intermediate representation capturing underlying computations of the at least two elements. The intermediate representation is capable of being simulated. The instructions further enable the step of propagating at least one of data or model characteristics of the at least two elements using the intermediate representation.

BRIEF DESCRIPTION OF THE FIGURES

An illustrative embodiment of the present invention will be described below relative to the following drawings.

DETAILED DESCRIPTION

Figure 1:
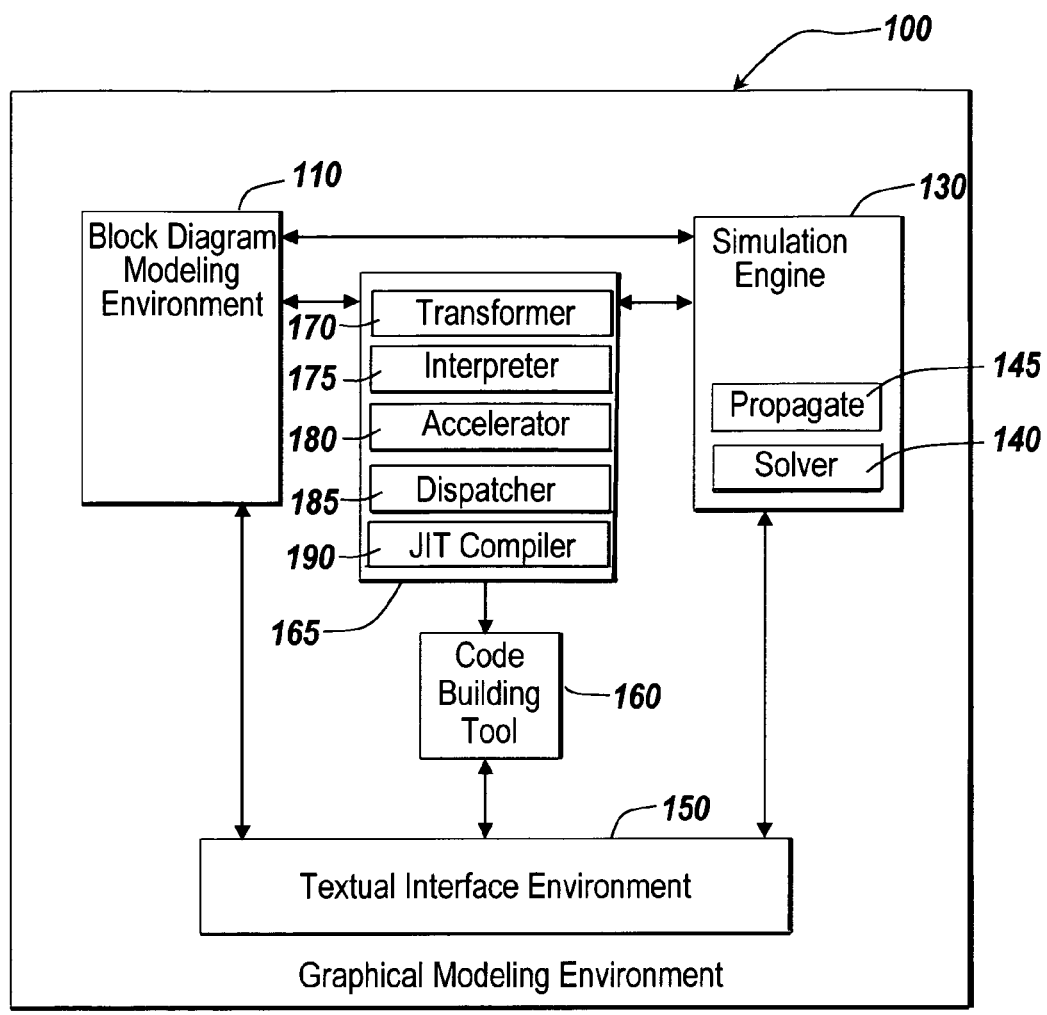
FIG. 1 depicts a high-level block diagram of an exemplary graphical modeling tool that may be used to implement the illustrative embodiment of the present invention.

The present invention provides an improved graphical modeling environment that converts elements of a graphical model to an intermediate representation in order to facilitate simulation, propagation and/or code generation from the graphical model. The intermediate representation may allow for propagation and simulation of elements in a graphical model with dynamically typed signals.

According to an illustrative embodiment, the present invention facilitates simulation, propagation and/or code generation by converting elements in a graphical model into intermediate representations, such as a control flow graph (CFG) or a data flow graph (DFG). The intermediate representation captures underlying computations of the elements in a graphical model, such as algorithmic aspects. The intermediate representation may allow for simulation and/or code generation of elements of a graphical model. The intermediate representation may also allow for propagation of data and/or model characteristics of the elements in the graphical model to determine the data and/or model characteristics that may not be specified. For example, a model developer can specify that selected data and/or model characteristics can be 'inherited' from other elements in the graphical model.

The illustrative embodiment of the present invention may provide a preliminary intermediate representation as a first intermediate representation that captures underlying computations, such as algorithmic aspects of elements in a graphical model. The first intermediate representation can be generated prior to compilation of the graphical model. In some instances, the first intermediate representation representing underlying computations of elements in a graphical model may be provided for the propagation of the data and/or model characteristics that are required to determine an algorithm of the element. The first intermediate representation may be converted into a second intermediate representation that is capable of being simulated and/or allowing propagation of data and/or model characteristics. The second intermediate representation may allow further propagation of data and/or model characteristics that are unknown prior to the conversion from the first intermediate representation to the second intermediate representation. The illustrative embodiment may further provide generating a third intermediate representation that may be based on either the first intermediate representation or the second intermediate representation. The third intermediate representation may also be used to facilitate simulation and/or propagation as well as code generation. Conversely, the illustrative embodiment may provide a first intermediate representation that is based on elements of a graphical model that is capable of being simulated or allowing propagation.

The intermediate representation may represent algorithmic aspects of user-specified elements in a graphical model that can support the propagation of data and/or model characteristics. For the user-specified elements whose algorithms are dependent on data and/or model characteristics, such as sample times and data types, the intermediate representations may represent the applicable algorithms for all the possible data and/or model characteristics. When the data and/or model characteristics cannot be propagated with an intermediate representation, the intermediate representation becomes inapplicable and is not processed. In this case, a user must specify functions to carry out the propagation.

The illustrative embodiment of the present invention provides an intermediate representation to facilitate solving a graphical model, such as solving an algebraic loop in the graphical model. To facilitate solving the graphical model or part of the graphical model elements in the graphical model are converted into an intermediate representation, such as a control flow graph (CFG) and a data flow graph (DFG).

A user-specified element can refer to an element that is developed by a developer that has direct access to the source code of the graphical modeling environment. A user-specified element can also refer to an element created by a user in a programming language, such as Java, C, C++ or MATLAB, with an application program interface (API) that may be provided by the graphical modeling environment.

An intermediate representation refers to a data structure that is stored in memory, in a file, in a database, or any other storage medium. According to the illustrative embodiment, the intermediate representation can be constructed from input data contained within a source modeling language of an element. The illustrative embodiment also allows a user to develop an intermediate representation for user-specified elements. The intermediate representation can be based on the computations that need to be performed and may not follow the model elements as they are presented in the graphical model. These intermediate representations allow optimizations to be applied across multiple elements of a graphical model.

Associations between the elements in the graphical model and nodes in the intermediate representation can be implemented. For example, the user can set breakpoints on execution of elements in the graphical model, thereby causing the simulation to halt at the corresponding operation in the intermediate representation.

In addition, data in the intermediate representation can be mapped back to the graphical model to enable, for example, debugging of the graphical model. In one implementation, an optimized intermediate representation can be provided that combines computations of certain elements. If a value from one of the elements needs to be displayed, a more detailed and less optimized intermediate representation can be substituted when requested during execution. For profiling purposes, an amount of computational time that is spent in parts of the intermediate representation can be maintained. This information can be presented to the user in terms of elements of the graphical model.

FIG. 1 is a high-level block diagram of an exemplary graphical modeling environment 100 for modeling, simulating, and analyzing dynamic systems. The environment 100 may include a block diagramming environment 110, a simulation engine 130, a textual interface environment 150, code building tool 160 and an intermediate representation generator 165. The block diagram modeling tool 110 may generate an intermediate representation to represent each element of a block diagram or to represent the block diagram itself. The transformer 170 is operable to transform the intermediate representation into an intermediate representation that may be simulated with simulation engine 130 and/or an intermediate representation that may be used for code generation by code building tool 160. Simulation engine 130 communicates with the intermediate representation generator 165 and receives an intermediate representation that was generated from a block diagram that is implemented in the block diagramming environment 110. The simulation engine 130 communicates refinements to models created in the block diagramming environment 110. The textual interface environment 150 can interact with the block diagramming environment 110, the simulation engine 130 and/or the code building tool 160. Such a textual interface environment may be MATLAB® from The MathWorks, Inc. of Natick, Mass. Using textual interface environment 150, a user may write a code that may be incorporated as an element of a block diagram in the block diagramming environment 110.

The graphical modeling environment 100 may also have a code building tool 160 that uses the intermediate representation. Code that is generated by code building tool 160 may be source code, object code, byte code, a compiled executable, or library, for forming an executable of a block diagram provided by the block diagramming environment 110. The code building tool 160 may comprise a code building tool such as Real-Time Workshop® from The MathWorks, Inc. of Natick, Mass., or any portion thereof that may be necessary to generate an intermediate representation, executable code, instructions, etc., in a programming language such as C. The code building tool 160 can generate source code for the execution of a block diagram that is provided by the block diagramming environment 110, compile the source code into object code and build an executable program, library or any other form of executable instructions. The code may be designed to run on any processor, microprocessor, operating system, computational hardware device, component of a computational hardware device or analog hardware. In one embodiment, the code may comprise embedded code targeted to run on any type of embedded system. Additionally, the code may be customized to run on a specific target hardware platform. The code may be a hardware description language, such as VHDL or Verilog.

The intermediate representation generator 165 of graphical modeling environment 100 may include a transformer 170, an interpreter 175, an accelerator 180, a dispatcher 185 and a just-in-time compiler 190. The transformer 170 functions to convert an intermediate representation provided by the block diagramming environment 110 into an intermediate representation. The interpreter 175 functions to execute components of an intermediate representation provided by the block diagramming environment 110. The accelerator 180 functions to analyze the intermediate representation in parallel with the interpreter 175 and is operable to invoke the code building tool to generate source code for part of or the entire intermediate representation and to allow the simulation engine 130 to execute the generated source code. The dispatcher 185 functions in parallel with the interpreter 175 and is operable to analyze the intermediate representation and replace an existing predefined simulation operation in the intermediate representation with another predefined simulation operation that is more efficient. The just-in-time compiler 190 is operable to determine if parts of simulation operations are suitable to be translated into native machine code and execute the translated native code.

The simulation engine 130 can include a solver 140 and a propagation unit 145. The solver 140 functions to solve the intermediate representation provided by the block diagramming environment 110. The solver 140 can generate behavior of a graphical model and can be based on a numerical integration scheme. Numerical integration schemes compute continuous-time behavior for a simulation. These integration schemes can be implicit or explicit and can employ multiple computation steps to obtain a new value of the behavior in time. The propagation unit 145 functions to propagate data and/or model characteristics, such as sample times, data types and dimensions, through the components of an intermediate representation provided by the block diagramming environment 110.

One skilled in the art will recognize that the intermediate representation generator 165 may be part of block diagram modeling environment 110, code building tool 160 or simulation engine 130. Further, the components of intermediate representation generator 165 may each exist in separate components. For example, block diagram modeling environment 110 may include interpreter 175, the intermediate representation generator 165 may include the propagation unit 145, while simulation engine 130 may include the accelerator 180, the dispatcher 185 and the just-in-time compiler 190. Further, it will be recognized by one skilled in the art that the illustrative embodiment may function with or without the accelerator 180, the dispatcher 185 and/or the just-in-time compiler 190.

Further, it will be recognized by one skilled in the art that the propagation unit 145 may be separate from the simulation engine 130. For example, the propagation unit 145 can be an independent component in the graphical modeling environment 100 or can be part of the intermediate representation generator 165 or the block diagram modeling environment 110.

One of ordinary skill in the art will also appreciate that the modeling environment 110, simulation engine 130, textual interface environment 150, and code building tool 160 may be provided on the same computing device, which will be described below in more detail with reference to FIG. 2, or alternatively, the modeling environment 110, simulation engine 130, and textual interface environment 150 may be coupled to each other via a communication network, which will be described below in more detail with reference to FIG. 3.

Figure 2:
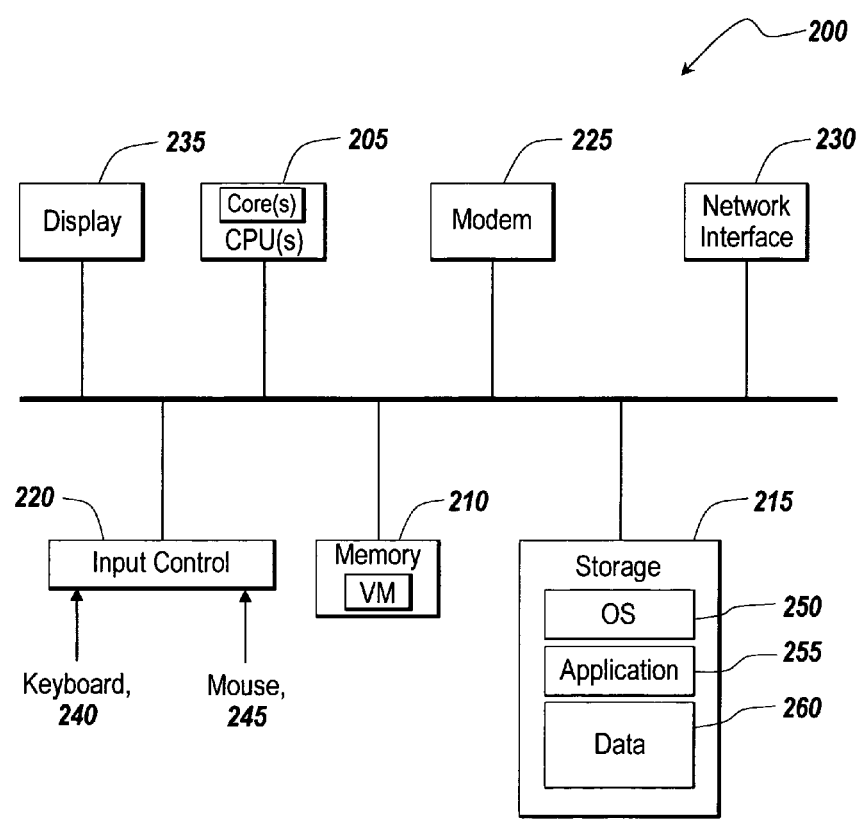
FIG. 2 depicts an exemplary computing device suitable for practicing the illustrative embodiment of the present invention.

FIG. 2 is an exemplary computing device 200 suitable for practicing the illustrative embodiment of the present invention. One of ordinary skill in the art will appreciate that the computing device 200 is intended to be illustrative and not limiting of the present invention. The computing device 200 may take many forms, including but not limited to a workstation, server, network computer, quantum computer, optical computer, bio computer, Internet appliance, mobile device, a pager, a tablet computer, and the like.

The computing device 200 may be electronic and include a Central Processing Unit (CPU) 205, memory 210, storage 215, an input control 220, a modem 225, a network interface 230, a display 235, etc. The CPU 205 controls each component of the computing device 200 to provide the block diagramming environment 110, simulation engine 130, textual interface environment 150, and code building tool 160. The memory 210 temporarily stores instructions and data and provides them to the CPU 205 so that the CPU 205 operates the computing device 200 and runs the block diagramming environment 110, simulation engine 130, textual interface environment 150, and code building tool 160.

Optionally, the computing device 200 may include multiple CPUs for executing software loaded in the memory 210, and other programs for controlling system hardware. Each of the CPUs can be a single or multiple core processor. The code loaded in the memory 210 may run in a virtualized environment, such as in a Virtual Machine (VM). Multiple VMs may be resident on a single processor. Also, part of the application could be run in hardware, for example, by configuring a field programmable gate array (FPGA), creating an application specific integrated circuit (ASIC) or creating an Application Specific Instruction Processor (ASIP).

The storage 215 usually contains software tools for applications. The storage 215 includes, in particular, code 250 for the operating system (OS) of the device 200, code 255 for applications running on the operation system including the applications for the block diagramming environment 110, simulation engine 130, textual interface environment 150, code building tool 160 and data 260 generated from the block diagramming environment 110, simulation engine 130, textual interface environment 150, and code building tool 160. Those of ordinary skill in the art will appreciate that the application can be stored in the memory 210 as well, much like the data, and even the OS, or they can be stored on the network described below with reference to FIG. 3.

The input control 220 may interface with a keyboard 240, a mouse 245, and other input devices. The computing device 200 may receive through the input control 220 input data, such as the input data for developing a block diagram. The computing device 200 may display on the display 235 user interfaces for displaying the data generated from the block diagramming environment 110, simulation engine 130, textual interface environment 150, and code building tool 160.

Figure 3:
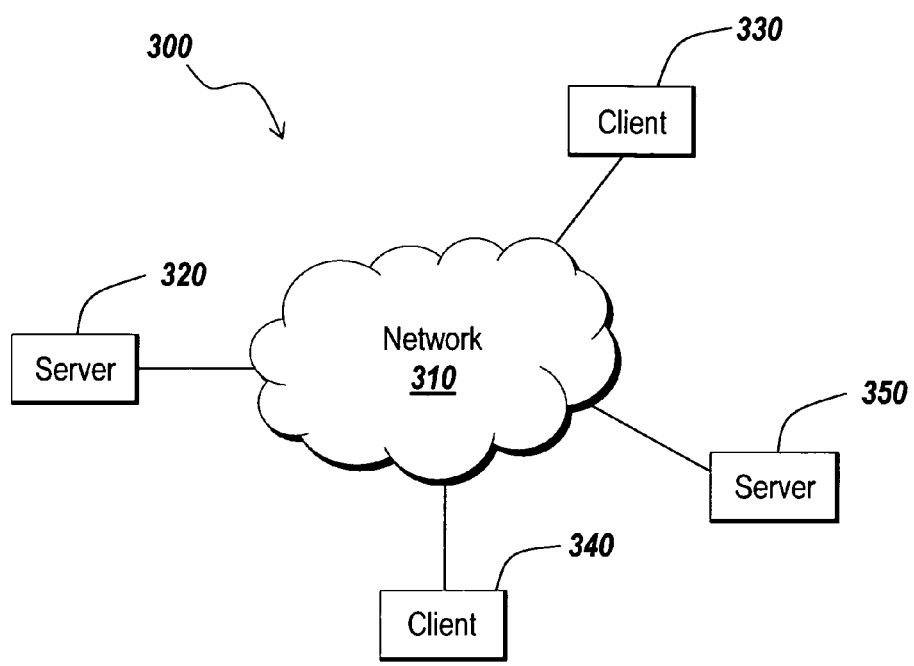
FIG. 3 depicts an exemplary distributed system suitable for the distributed implementation of the illustrative embodiment.

FIG. 3 is an exemplary network environment 300 suitable for the distributed implementation of the illustrative embodiment. The network environment 300 may include one or more servers 320 and 350 coupled to clients 330 and 340 via a communication network 310. The network interface 230 and the modem 225 of the computing device 200 enable the servers 320 and 350 to communicate with the clients 330 and 340 through the communication network 310. The communication network 310 may include Internet, intranet, LAN (Local Area Network), WAN (Wide Area Network), MAN (Metropolitan Area Network), wireless network (e.g., using IEEE 802.11 and Bluetooth), etc. The communication facilities can support the distributed implementations of the present invention.

In the network environment 300, the servers 320 and 350 may provide the clients 330 and 340 with software components or products under a particular condition, such as a license agreement. The software components or products may include those for providing the block diagramming environment 110. The software components or products may also include those for the simulation engine 130, textual interface environment 150, and code building tool 160 coupled to the block diagramming environment 110. For example, the client 340 may perform the modeling of a dynamic system using a software component provided by the server 320 and send the server 320 the model for simulation. The server 320 then returns the simulation results to the client 340 and the client 340 may subsequently display the data to the user with the information on the data.

Figure 4:
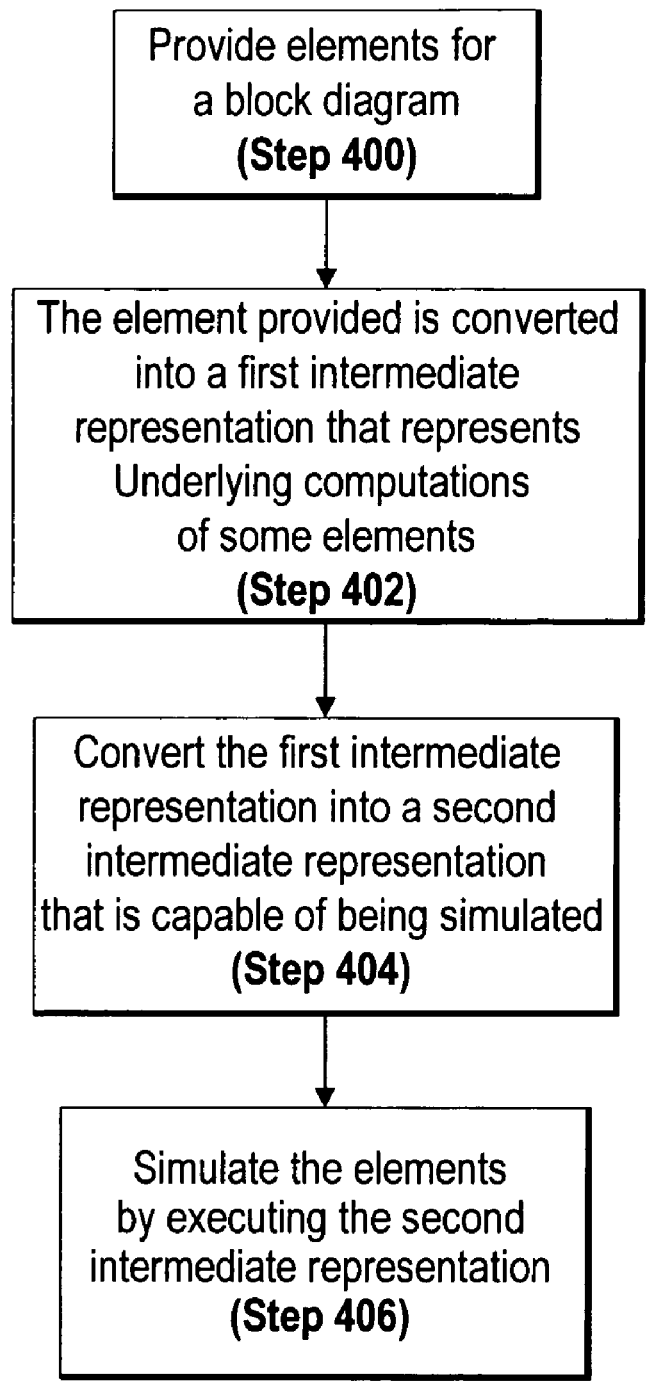
FIG. 4 depicts a flow diagram that depicts the steps that the illustrative embodiment takes to convert an element in a graphical model into an intermediate representation that is capable of being simulated.

FIG. 4 is a flow diagram that depicts the steps for implementing the illustrative embodiment of the present invention. The graphical modeling environment 100 enables a user to provide elements for a block diagram where one element can be a user-specified element for a block diagram (Step 400). The graphical modeling environment 100 allows a user to develop user-specified elements. User-specified elements allow a user to create custom elements for a block diagram model using a computer language to describe the element. User-specified elements can be developed by developers who have access to the source code of the block diagram modeling environment and the user-specified elements can implement a functionality desired by the developer. Also, a graphical modeling environment such as Simulink® from The Mathworks, Inc. of Natick, Mass. can provide an application program interface (API) that allows a user to create elements that may be written in C, C++, Ada, Fortran, or MATLAB® from The MathWorks, Inc. of Natick, Mass. The element provided by the user is converted into a first intermediate representation that captures underlying computations of some of the elements (Step 402).

In some instances, both user-specified and predefined elements can require initial conditions and initialization computations for simulation. The initialization computations can be transformed into the first IR in a similar manner as the algorithms that capture the dynamics of the model elements are transformed.

The pseudo code below provides an example of how an intermediate representation can be generated in accordance with the present invention. One skilled in the art will recognize that the provided pseudo code is merely provided as an example of one implementation for generating an intermediate representation and is not meant to be limiting.

1. //
2. // Generate intermediate representation for
3. // discrete integration of Y=X+U*Ts
4. //
5. // Retrieve data
6. DataStore*U=get_block_input(block);
7. DataStore*Ts=get_block_sample_time(block);
8. DataStore*X=get_block_state(block);
9. DataStore*Y=get_block_output(block);
10. DataStore*tmpData=create_temp_data_store( );
11. //
12. // Construct simulation operation of tmpData=U*Ts
13. SimOpNode*op1=create_sim_op_multiply(tmpData, U, Ts);
14. //
15. // Construct simulation operation of Y=X+tmpData
16. SimOpNode*op2=create_sim_op_add(Y, X, tmpData);
17. //
18. // Create an object of intermediate representation
19. IRGraph irGraph=create_intermediate_representation_graph( );
20. //
21. // Insert the simulation operations to the intermediate representation
22. irGraph->insert(op1);
23. irGraph->insert(op2);

The above pseudo code illustrates how an intermediate representation is generated for a discrete integration block. From line 6 to line 10 in the above pseudo code, data stores for the discrete integration are retrieved in the form of the data structure DataStore. The data structure DataStore has all the information about the data, including data type, dimension, complexity, memory storing the data, etc. Line 13 in the above pseudo code illustrates the generation of a simulation operation node that multiplies the input U with sample time Ts and save the results in the temporary DataStore tmpData. The data structure SimOpNode includes all the information about a simulation operation, including its operation type, input and output operation data, rounding and saturation mode, execution rate, simulation operation routines, etc. Line 16 in the above pseudo code illustrates the generation of a second simulation operation node that adds the state X with tmpData and saves the result into the DataStore Y. In line 19, a data structure IRGraph is created to contain the intermediate representation. The data structure IRGraph contains all the information about the intermediate representation, including the simulation operations and their execution order. The data structure IRGraph could be a control flow graph that is similar to a control flow graph depicted in FIG. 5A, which is discussed below. The intermediate representation can represent the structure of the elements, such that the graphical relation between the elements is captured, or alternatively the intermediate representation can be independent of the graphical relation of the elements in the graphical model. Lines 22 and 23 in the above pseudo code illustrate the addition of two simulation operations to the intermediate representation data structure.

Figure 5A:
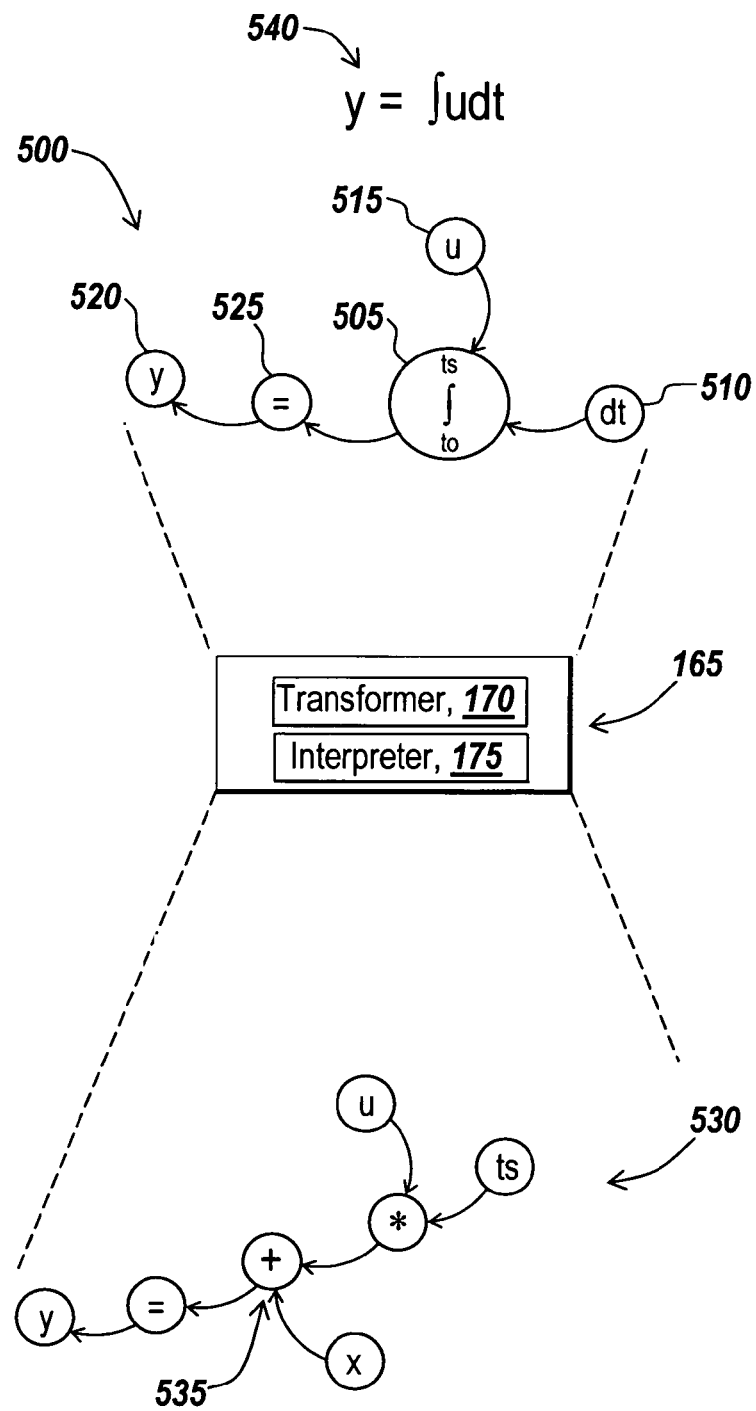
FIG. 5A depicts an example of intermediate representations that are generated by the illustrative embodiment.

Referring again to FIG. 4, the first intermediate representation may be a control flow graph (CFG) that includes nodes and edges. The nodes of the CFG of the first intermediate representation represent the algorithmic aspects of the element and the edges represent connections of the nodes. According to the illustrative embodiment of the present invention, the first intermediate representation includes nodes that are not capable of being simulated. For example, FIG. 5A depicts a CFG 500 that represents expression 540, which includes the mathematical operation of discrete-time integration. CFG 500 includes integration node 505 that represents the integration operation of expression 540. The CFG also includes identifier nodes 510, 515 and 520 that represent the constants and variables of expression 540, and an assignment node 525 that assigns the left side of expression 540 to the right side of expression 540. In this example, the graphical modeling environment 100 is not capable of simulating integration node 505 because it is not supported by the simulator.

As a result, the graphical modeling environment 100 converts the first intermediate representation into a second intermediate representation that is capable of being simulated (Step 404), as depicted in FIG. 4. The second intermediate representations may also be a CFG, but could take another form such as, for example, a data flow graph (DFG). The nodes of the CFG that are capable of being simulated represent simulation operations. One skilled in the art recognizes that the use of control flow graph in this example is merely for illustrative purposes and that other forms of intermediate representations can be used.

Referring again to FIG. 4, the first intermediate representation may be a data flow graph (DFG) that includes nodes and edges. The nodes of the DFG of the first intermediate representation represent the operations of the algorithmic aspects of the element and the edges represent the data dependencies between the operations. In a data flow graph, the operations may not be ordered to achieve a sequence of computations. Such a sequence can be obtained by data dependency analysis but can be left unspecified, for example, in case execution is implemented directly in hardware.

Figure 6A:
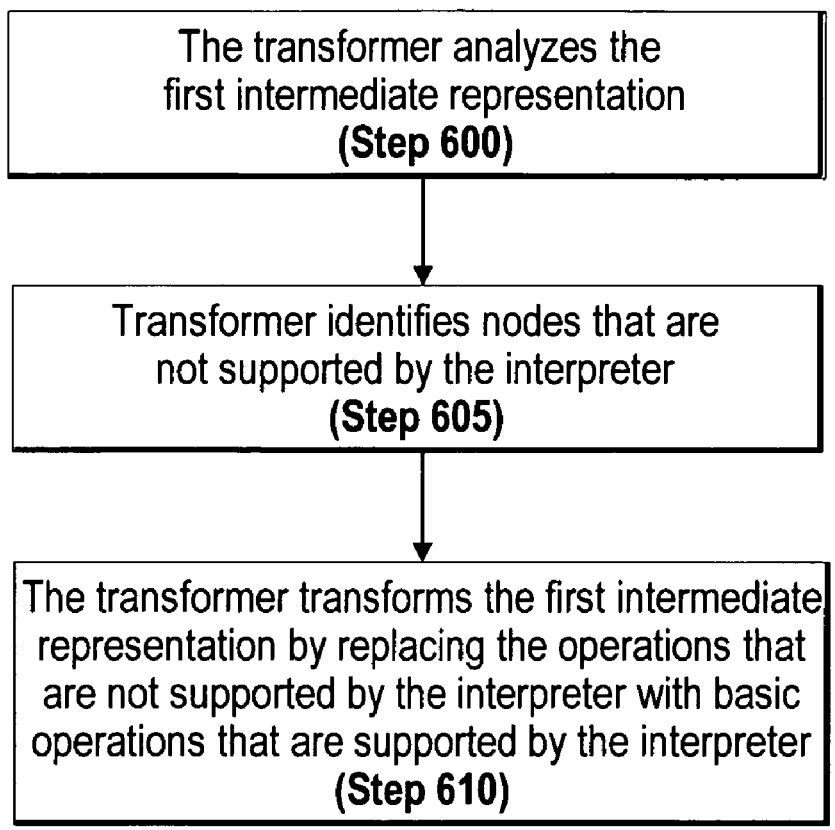
FIG. 6A depicts a flow diagram for the steps a transformer takes when converting an intermediate representation that represents algorithmic aspects of an element to an intermediate representation that is capable of being simulated.

To convert the first intermediate representation (IR) into the second IR the transformer 170 may be used. Transformer 170 analyzes and transforms the first IR into the second IR, which can be simulated. For example, CFG 500 is converted into CFG 530 by the IR generator 165. FIG. 6A is discussed in conjunction with FIG. 5A and depicts a flow diagram of the steps the transformer 170 uses to convert the first IR to the second IR. The transformer 170 analyzes the first IR represented by CFG 500 (Step 600), and identifies nodes that are not supported by the simulator, which in this case is the integration node 505 (Step 605). The transformer 170 transforms CFG 500 by replacing the integration operation with basic operations that are supported by the simulator (Step 610). That is, the nodes of CFG 530 are predefined simulation nodes that represent predefined simulation operations. As a result of the conversion, CFG 530 is capable of being simulated and represents expression 540, and therefore, CFG 500.

Figure 5B:
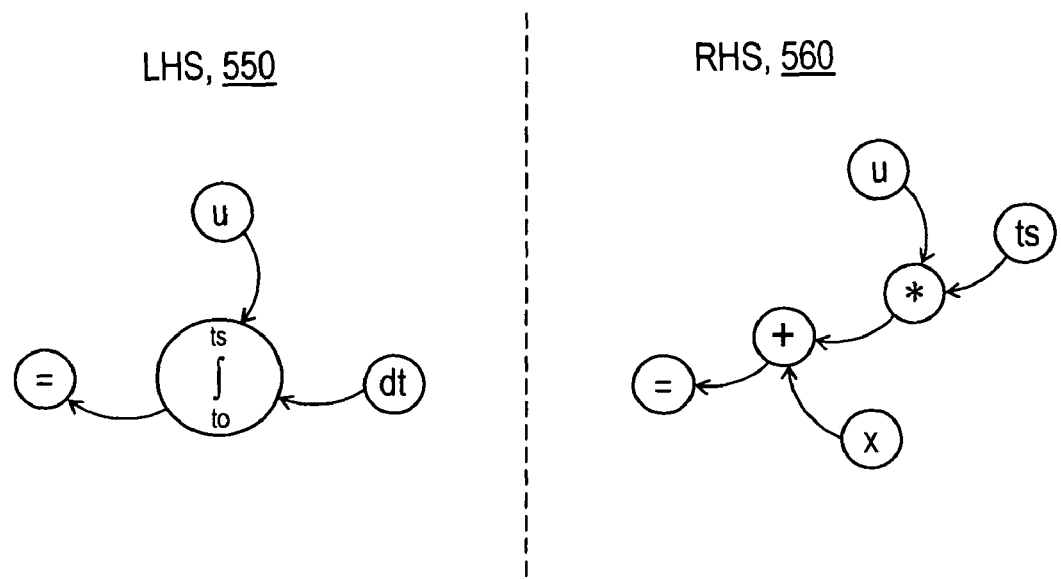
FIG. 5B provides an example of a graphical illustration of graph rewriting in accordance with the illustrative embodiment.
Figure 6B:
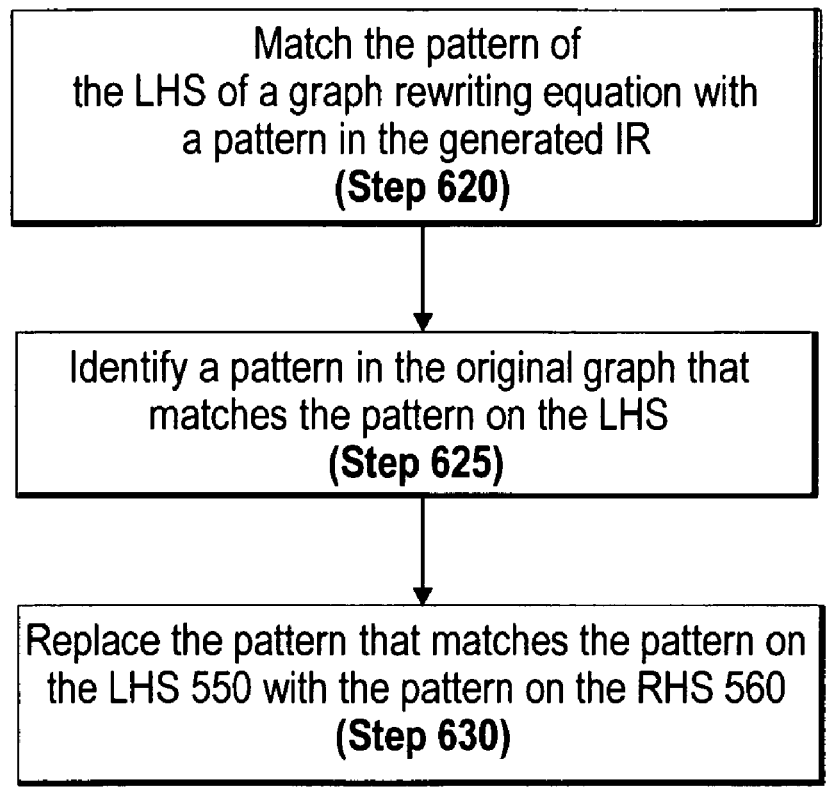
FIG. 6B is a flow diagram that illustrates an example of the steps performed to implement graph rewriting in accordance with the illustrative embodiment.

The transformer 170 can use graph rewriting to convert the first intermediate representation to a second intermediate representation. FIG. 5B provides a graphical illustration of graph rewriting. FIG. 6B is a flow diagram that illustrates the steps performed to implement graph rewriting. FIG. 5B includes a left-hand side (LHS) 550 and a right-hand side (RHS) 560 of a graph rewriting operation. The transformer 170 tries to match the pattern depicted on the LHS 550 in the generated IR of an element or part of a graphical model (step 620). The generated IR can be referred to as the original graph. The transformer 170 identifies a pattern in the original graph that matches the pattern depicted on the LHS 550 (step 625) and replaces the pattern that matches the pattern on the LHS 550 with the pattern on the RHS 560 (step 630). Pattern matching can be implemented in various ways, but is typically guided by heuristics to manage the computational complexity. Modular and hierarchical graph rewriting methods such as employed by GREAT, developed at Vanderbilt University of Nashville, Tenn., to further improve the transformation efficiency. The transformation may employ any number of rewriting rules that can be extended by textual transformation information. The rewriting rules may include negativity constraints, such as, for example, what aspects of a pattern should not be present in the LHS for it to be replaced by the RHS.

Referring again to FIG. 4, the element provided by the user is simulated by the interpreter 175 by executing the second IR (Step 406). To simulate the element, each node in the control flow graph is called and the basic operations of the nodes are executed.

During simulation, an intermediate representation may change dynamically. For example, a model of an electrical circuit may consist of a series, connection between a battery, electrical switch, resistor, and capacitor. When the switch is closed, the IR that represents the functionality of the resistor may compute the current flow through the series connection by Ohm's Law as current=Vresistor/R, where Vresistor is the voltage drop across the resistor and R is the resistor value. The value of Vresistor is computed by taking the difference between the voltage of the battery and the voltage of the capacitor. If during simulation the switch is opened, the IR that represents the functionality of the resistor may change to compute the voltage drop across the resistor from the current that flows through the series connection, Vresistor=current*R. In this case, there is no current flow because the switch is open. Thus, the functionality of the resistor, and therefore the IR that represents the functionality of the resistor can be reduced to Vresistor=0. The different intermediate representations can be pre-computed and the inactive ones can be guarded by a logical condition. Alternatively, the new intermediate representation can be derived during execution.

Figure 6C:
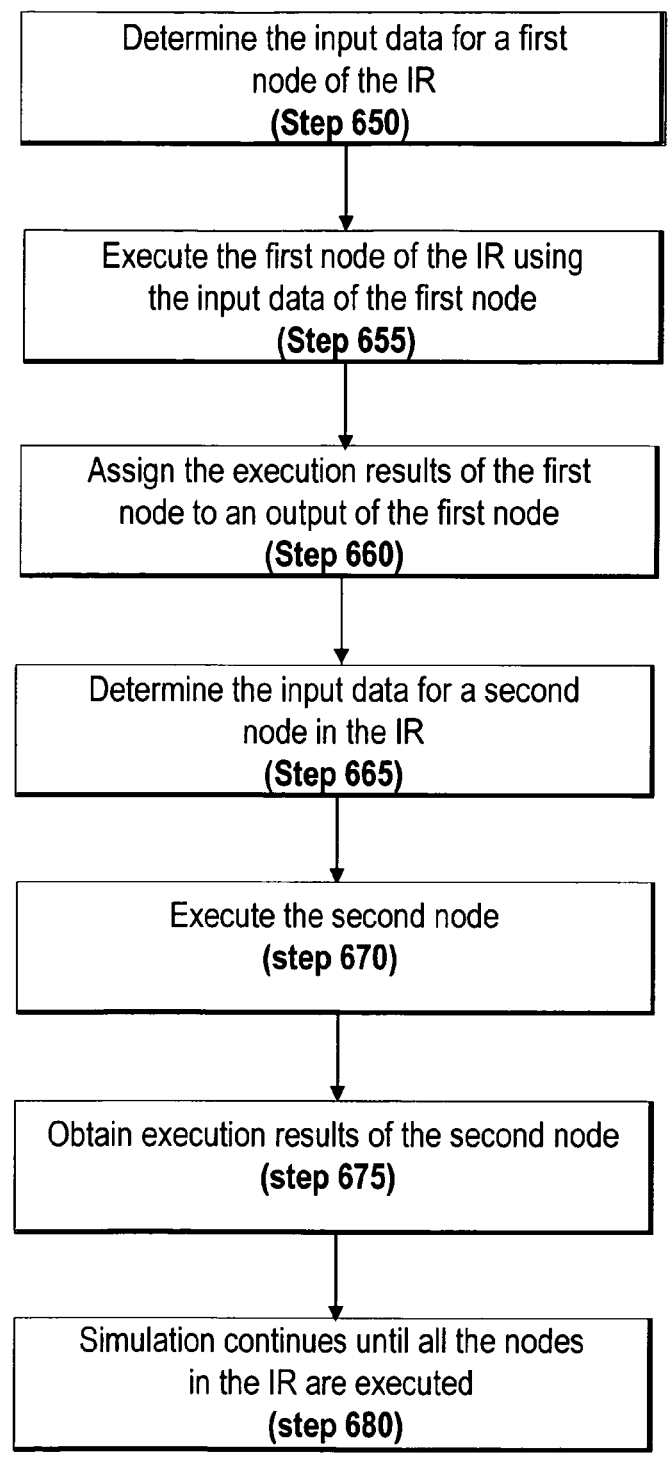
FIG. 6C depicts a flow diagram that illustrates the steps for performing an interpretive simulation of an intermediate representation.

FIG. 6C depicts the steps implemented in accordance with the illustrative embodiment for an interpretive simulation of an IR. To simulate the IR, the interpreter 175 determines the input data for a first node of the IR (step 650). The interpreter 175 executes the first node of the IR using the input data of the first node (step 655). The interpreter 175 assigns the execution results of the first node to an output of the first node (step 660). The interpreter 175 determines the input data for a second node in the IR (step 665) and executes the second node (step 670). The execution results of the second node obtained (step 675). The simulation may be continued until all the nodes in the IR are executed by the interpreter 175 (step 680).

Both user-specified and predefined elements can have parameters, such as expressions or functions, that have to be evaluated before or during simulation to compute a parameter value for simulation. Algorithmic aspects such as additions, multiplications, logic evaluations at decision points to determine branches of computation, function evaluations, etc., may be used to compute parameter values of model elements before or during simulation. The computed parameter values can be represented in the IR. For example, a user may specify an element that includes a parameter that is defined by an expression that includes constants and variables. The simulation engine 130 may determine the value of each variable in the expression and evaluate the expression to compute the parameter value by performing the operations specified by the expression. In this manner, each time a variable in the expression changes, the simulation engine 130 can determine the value of the variable and can reevaluate the expression to compute an updated parameter value. The parameters and variables may be part of the model, optionally stored in local workspaces, such as, for example, that of a masked subsystem. A subsystem allows a user to provide layers of graphical models within a graphical model to facilitate containment, separation and/or nesting for a part of the graphical model. A user may descend into the subsystem view from the top level to view the details of this subsystem model. A masked subsystem provides encapsulation to control the operation and interaction of the blocks contained in the block diagram. A masked subsystem allows a user to create a self-contained functional unit that has application-specific parameters. The application-specific parameters are mapped to generic parameters of the underlying elements in the masked subsystem. The parameters and variables may also be available in a workspace that can be global to the model, a number of models, or to the graphical modeling environment.

Figure 7:
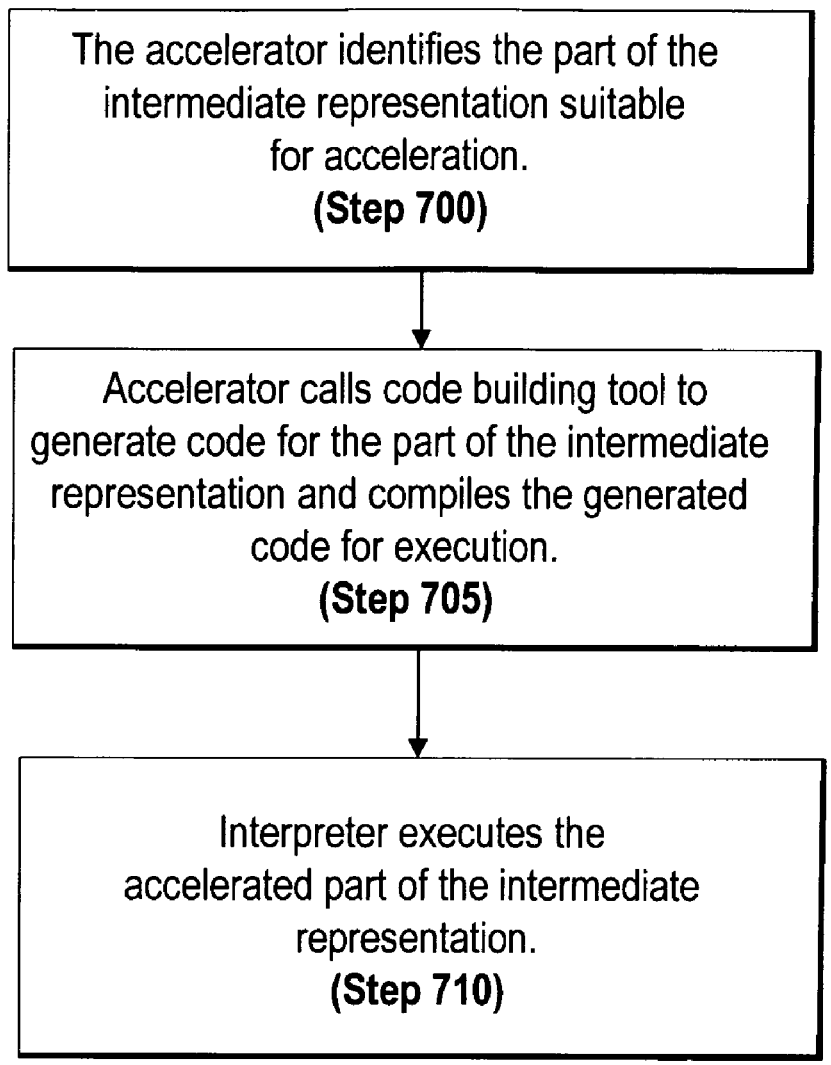
FIG. 7 depicts a flow diagram illustrating an implementation using an accelerator.

In another embodiment, the accelerator 180 may be used to dynamically generate a more efficient simulation operation to replace the part of or the entire IR. FIG. 7 is a flow diagram that depicts the steps performed by the accelerator 180. The accelerator first identifies the part of the IR that can be sped up by acceleration (Step 700). After the identification is made, the accelerator 180 dynamically calls code building tool 160 to generate code for the identified part of the IR and compiles the generated code for execution (Step 705). For example, the generated code can be compiled in native binary code or byte code. Then the interpreter 175 executes the part of the IR by executing that part of the IR (Step 710).

Figure 8:
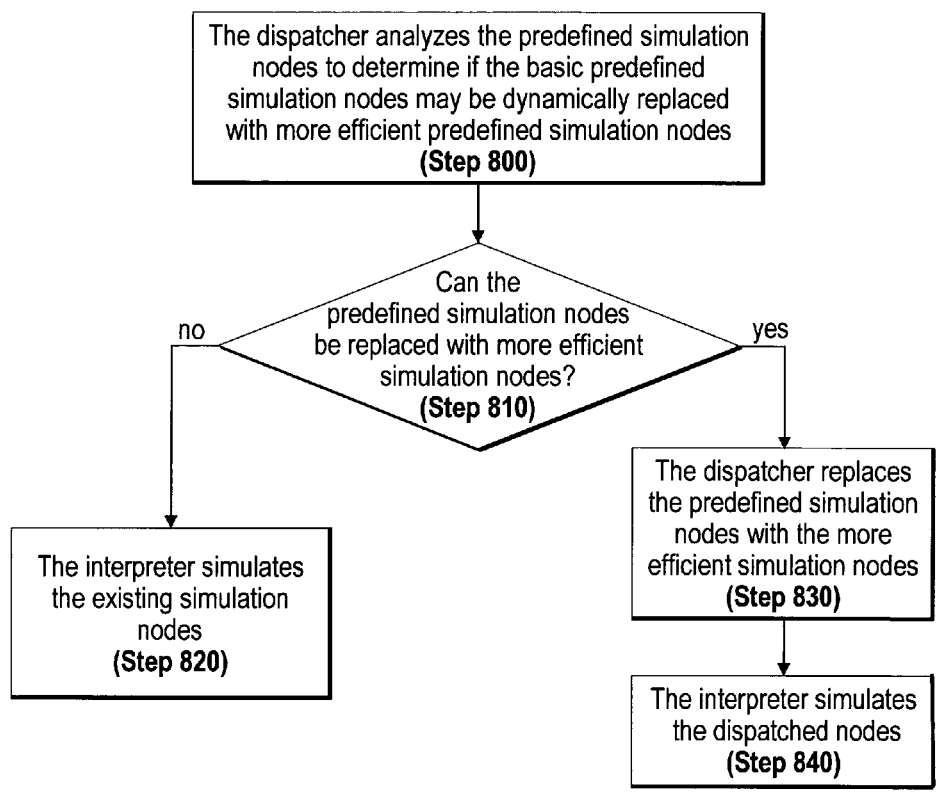
FIG. 8 depicts a flow diagram illustrating an implementation using a dispatcher.

In another embodiment, a dispatcher may replace existing simulation operations with more efficient predefined simulation operations. FIG. 8 is a flow diagram that depicts the steps performed by the dispatcher 185. For example, referring again to FIG. 5A, the transformer 170 identifies that the integration node 505 cannot be simulated. After the identification is made, the transformer 170 selects the predefined simulation nodes to replace the integration node 505. The dispatcher 185 analyzes the predefined simulation nodes to determine if the basic predefined simulation nodes may be dynamically replaced with more efficient predefined simulation nodes (Step 800). If the predefined simulation nodes cannot be replaced with more efficient simulation nodes (Step 810), the interpreter 175 will simulate the existing nodes in the IR (Step 820). If, however, the predefined simulation nodes can be replaced with more efficient simulation nodes (Step 810), the dispatcher 185 replaces the predefined simulation nodes with the more efficient simulation nodes (Step 830) and the interpreter 175 simulates the dispatched nodes (step 840).

An example of a more efficient predefined simulation node may be discussed in relation to summation node 535. There may be multiple summation nodes for the interpreter 175 to choose from. For example, there may be a summation node that only works with integers, a summation node that only works with floating point numbers, and a summation node that works with both types of numbers. The dispatcher 185 functions to identify the type needed for the summation node and replaces the summation node with a summation node that works with the required type(s). If the summation node works with all types, but the summation node only needs to work with integers, the dispatcher 185 replaces the summation node with the summation node selected by the dispatcher 185. By replacing the summation node that works with all types with a summation node that works with a specified type the simulation time may be reduced. This is because the summation node that works with all types may include excess code that is not necessary to simulate for a summation node that only needs to work with a specified type.

Figure 9:
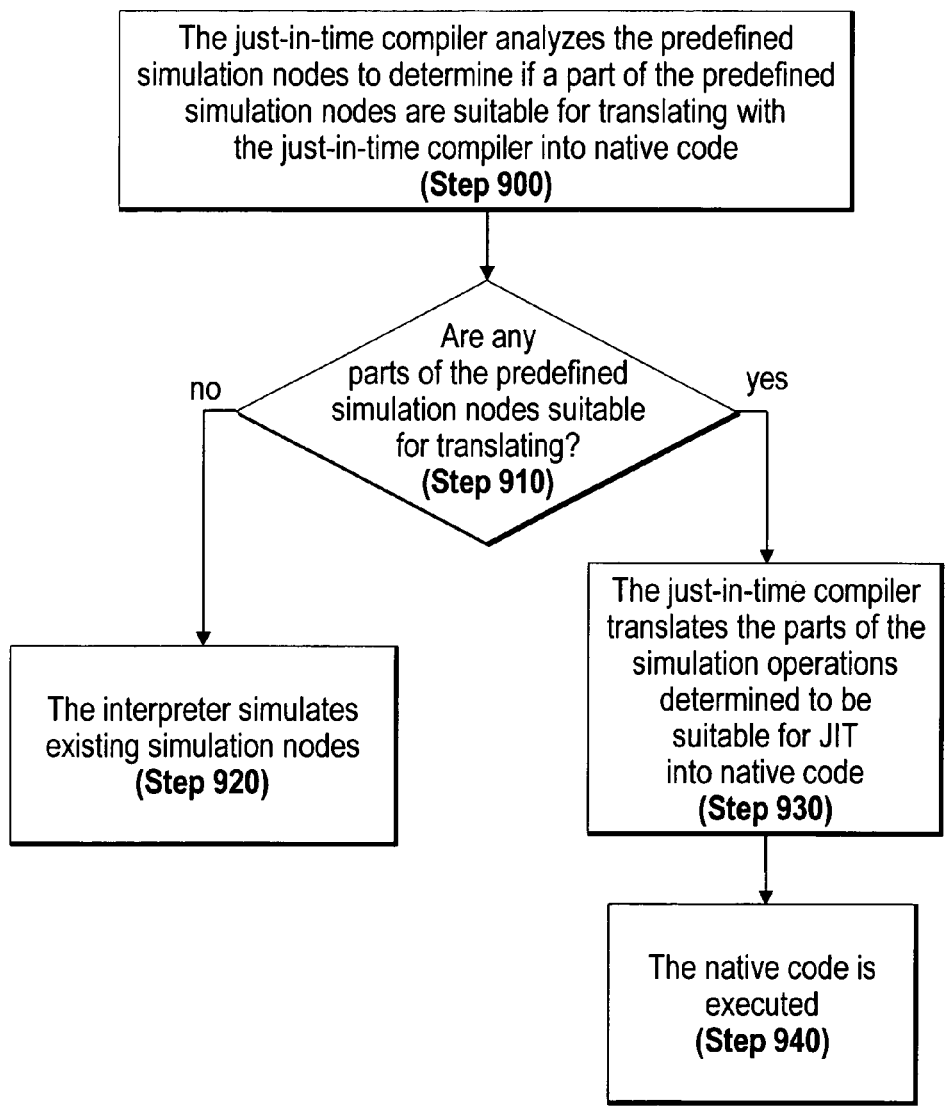
FIG. 9 depicts a flow diagram illustrating an implementation using a just-in-time compiler.

In another embodiment, the just-in-time compiler 190 may determine a part of a simulation operation that is suitable for translating with the just-in-time compiler 190 into native code. FIG. 9 is a flow diagram that depicts the steps performed by the just-in-time compiler 190. For example, referring again to FIG. 5A, the transformer 170 identifies that the integration node 505 cannot be simulated. After the identification is made, the transformer 170 selects the predefined simulation nodes to replace the integration node 505. The just-in-time compiler 190 analyzes the predefined simulation nodes to determine if a part of the predefined simulation nodes are suitable for translating with the just-in-time compiler 190 into native machine code (Step 900). If no parts of the predefined simulation nodes are suitable for translating (Step 910), the interpreter 175 executes the existing simulation nodes in the IR (Step 920). If, however, a part of the predefined simulation nodes are suitable for translating (Step 910), the just-in-time compiler 190 translates the parts of the simulation operations determined to be suitable for translating into native machine code (Step 930). The native machine code may then be executed with the simulation nodes during simulation (Step 940). For example, the simulation operations of fixed-point data types could be translated into native machine code to speed up the simulation since the simulation operations of fixed-point data types are usually more time intensive. Similarly, if dedicated hardware is available such as a facility for fast Fourier transform (FFT) computations, the IR may retain an FFT element for computation and may implement the FFT element in simulation using the dedicated hardware.

One skilled in the art will recognize that the graphical modeling environment 100 may include any combination of the accelerator 180, dispatcher 185 and just-in-time compiler 190 with the interpreter 175. For example, the graphical modeling environment 100 may only include the accelerator 180, the dispatcher 185 or the just-in-time compiler 190 with the interpreter 175 or the graphical may include two out of the three of the accelerator 180, the dispatcher 185 and the just-in-time compiler 190 with the interpreter 175. Also, the graphical modeling environment 100 may include the accelerator 180, the dispatcher 185 and the just-in-time compiler 190 with the interpreter 175. Further, the graphical modeling environment 100 may not include either the accelerator 180, or the dispatcher 185, or the just-in-time compiler 190 with the interpreter 175.

Figure 10:
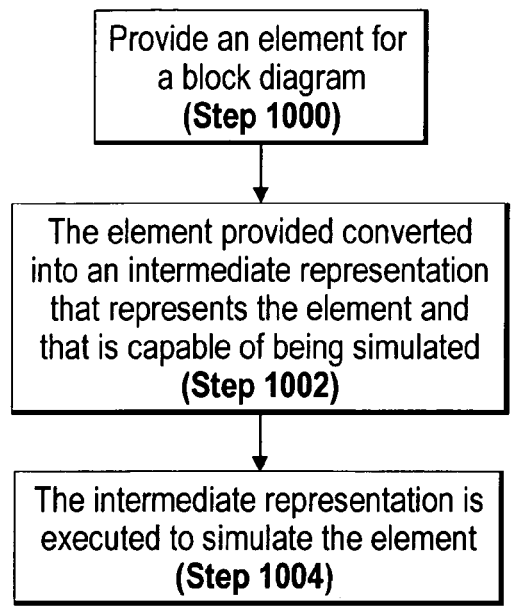
FIG. 10 depicts a flow diagram that provides the steps for implementing another aspect of the present invention in which an intermediate representation that is capable of being simulated is generated directly from an element in a graphical model.

FIG. 10 is a flow diagram that depicts the steps for implementing one embodiment of the present invention. The graphical modeling environment 100 enables a user to provide a user-specified element in a block diagram (Step 1000). The graphical modeling environment 100 allows a user to develop user-specified elements such as S-functions. An element provided by the user is converted into an IR that represents the element and that is capable of being simulated (Step 1002). The IR may be a control flow graph, and may be executed to simulate the element (Step 1004). The graphical modeling environment 100 may also generate an IR for code generation from the IR that is capable of being simulated.

Figure 11:
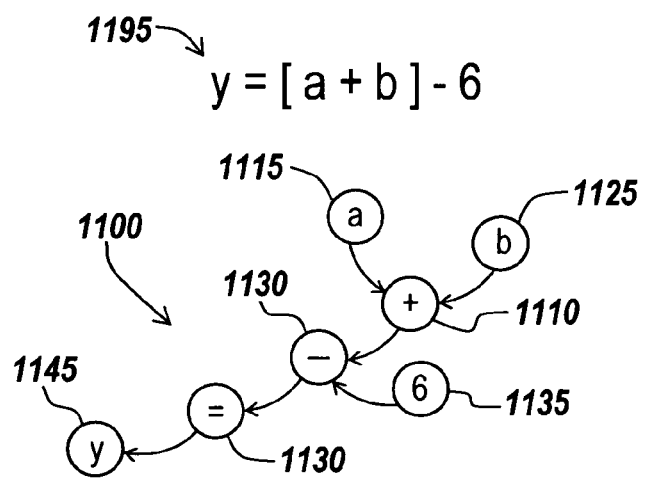
FIG. 11 depicts an example of an intermediate representation generated from an element in a graphical model that is capable of being simulated.

FIG. 11 depicts a CFG 1100 that may be generated in accordance with the present invention. CFG 1100 represents expression 1195, which includes mathematical operations. CFG 1100 includes summation node 1110, subtraction node 1130, identifier nodes 1115, 1125, 1135 and 1145 that represent the constants and variables of expression 1195, and an assignment node 1150 that assigns the left side of expression 1195 to the right side of expression 1195. In this case, CFG 1100 is capable of being simulated by the graphical modeling environment 100. As discussed above and applicable here, the graphical modeling environment 100 may use an interpreter 175, as depicted in FIG. 6A; the accelerator 180, as depicted in FIG. 7; the dispatcher 185, as depicted in FIG. 8; and/or the just-in-time compiler 190, as depicted in FIG. 9, to manipulate CFG 1100.

Figure 12:
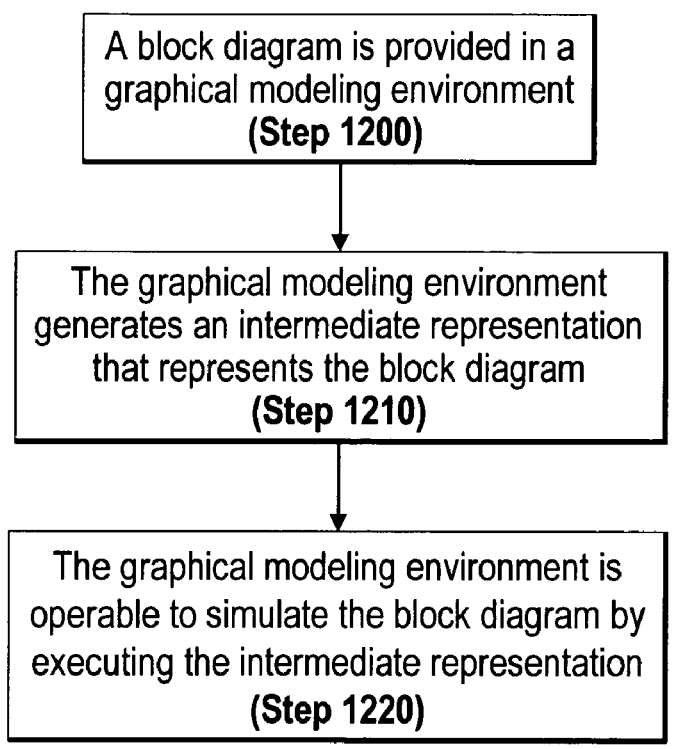
FIG. 12 depicts a flow diagram for implementing steps of another aspect of the present invention where an intermediate representation is generated to incorporate the entire graphical model.

The illustrative embodiment of the present invention also provides generating an IR based on a block diagram in a graphical modeling environment. For example, referring to FIG. 12, a user may provide a block diagram in a graphical modeling environment (Step 1200). The block diagram may include predefined elements and user-specified elements. The graphical modeling environment generates an IR that represents at least a part of the block diagram (Step 1210). The IR is capable of being simulated and may have been generated from a preliminary IR that was not capable of being simulated. The graphical modeling environment is operable to simulate the block diagram by executing the IR (Step 1220). In this manner, a user can generate an IR that can be used to simulate textual elements and graphical elements. For example, a user can specify a textual element using the technical computing language of MATLAB® from The MathWorks, Inc of Natick, Mass. and can specify a graphical element using Simulink® from The MathWorks, Inc in a single model.

Further, an IR that incorporates graphical elements from a graphical modeling environment such as Simulink® can be combined with an IR that is generated for states in a state diagramming environment such as Stateflow® from The MathWorks, Ines. In this manner, a user can create an IR that includes, for example, both Simulink® and Stateflow® elements and the IR can be simulated. Optimizations can be performed on the merged IR and across model parts. A merged IR that includes both Simulink® and Stateflow® elements allows Simulink® elements to supply Stateflow® elements with data and controls when a Stateflow® chart is executed and further allows Stateflow® to supply Simulink® with data of an output of an element in Stateflow®. Also, Stateflow® can control how parts of Simulink® are executed by using triggers such as function-calls.

Figure 13:
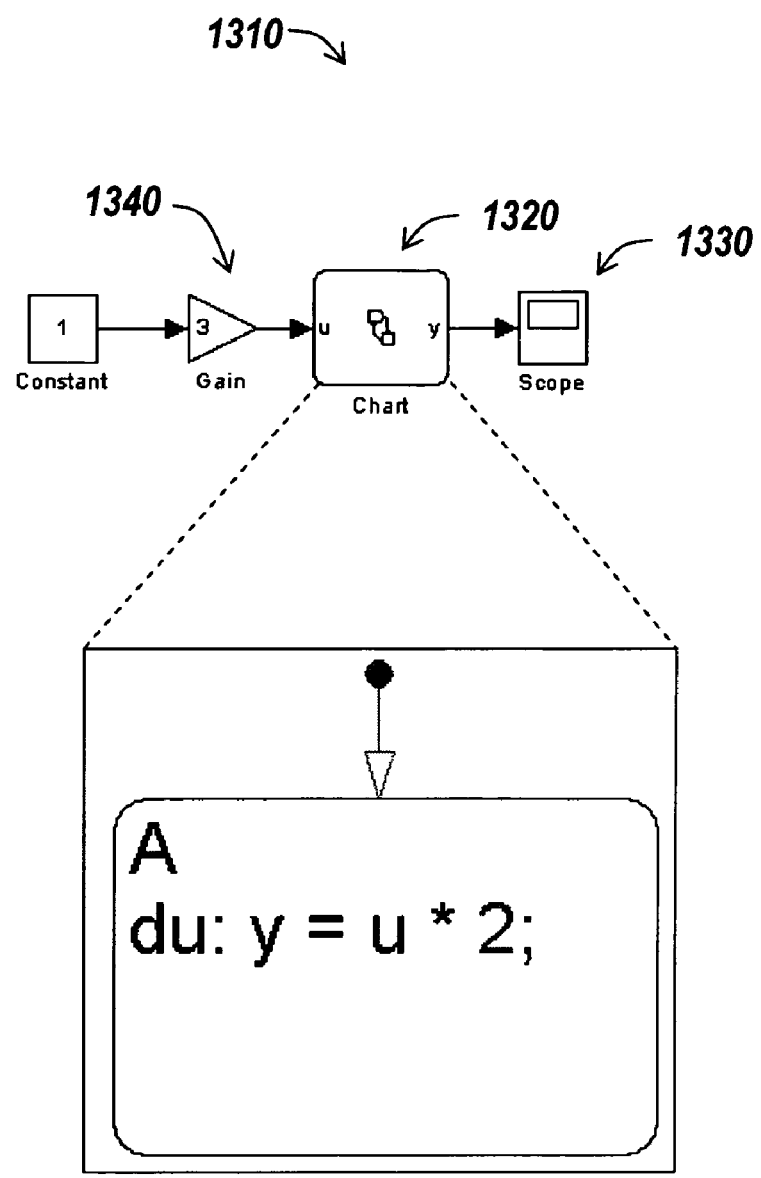
FIG. 13 is an illustrative example of an optimization across graphical modeling formalisms that an intermediate representation can facilitate in accordance with the illustrative embodiment.

FIG. 13 illustrates an example of an optimization across graphical modeling formalisms that an intermediate representation can facilitate in accordance with the illustrative embodiment. FIG. 13 depicts a Simulink® model 1310 in which a constant value of 1 that is provided by the constant element is multiplied by a factor, 3, that is provided by the gain element 1340. The output of the gain element 1340 is used as an input by a Statechart® model 1320 to compute an output of the state chart as 2 times the input. This computation is modeled as the 'during' action of a state A. This state A is activated upon first evaluation of the Statechart® because of the default transition (indicated by an arrow with solid circle at its base) to this state. The output of the Statechart® model 1320 in the Chart block can be displayed using the Scope block 1330. Because the constant value of 1 does not change during execution, the computations can be reduced to show a value of 2*3*1 as displayed by the Scope block 1330, without the need for more than one evaluation, and irrespective of the number of time points for which the value is required. This constant propagation optimization is achieved by using the same intermediate representation for the block diagram computations as modeled in the Simulink® graphical model 1310 as well as for the state transition computations as modeled by the Stateflow® graphical model 1320. One skilled in the art will recognize that the above example is provided as an illustration of an optimization that can be performed and is not meant to be limiting. Accordingly, one skilled in the art will recognize that other optimizations can be performed within the scope of the illustrative embodiment, such as, but not limited to loop unrolling, expression folding and inlining.

The IR may also be used for code generation and may generate code in a programming language, such as Java, C, C# or C++ or may generate a hardware description language representation in, for example, VHDL and Verilog. The code generation may use a Target Language Compiler (TLC). The TLC generates code representing a compiled IR that describes the execution semantics of the IR in a programming language, such as C or C++. TLC code may be generated from the IR.

In the same fashion, as discussed above with respect to FIGS. 4-11, the graphical modeling environment may include an interpreter 175, an accelerator 180, a dispatcher 185 and/or a just-in-time compiler 190, as depicted in FIGS. 6A-9, respectively. It will also be recognized by one skilled in the art that the graphical modeling environment may generate another IR from the IR that can be used for code generation.

An IR for code generation may be generated from either an IR that represents algorithmic aspects of an element or block diagram or an IR that is capable of being simulated. The generated code can be compiled and used in an interpretive simulation of the block diagram. The generated code can be in a programming language such as TLC, Java, C, C#, or C++, or can in a hardware description language, such as VHDL or Verilog.

The generated code may be derived from a general intermediate representation that is parameterized, and can be generated before the graphical model is processed to derive unspecified data and/or model characteristics. For example, the intermediate representation of a gain operation that multiplies its input by a given factor may depend on the dimension of an input to the gain operation. In the case of three or less elements in the input, each of the multiplications may be specified as individual computations. However, in case of more than three elements, an iteration loop may be employed, which only includes one multiplication that is executed multiple times.

For the case where the intermediate representation of the gain operation is based on information about the dimension of the input, the intermediate representation can consist of either the individual multiplications or the loop. For the case where the intermediate representation is not based on information about the input dimensions because, for example, the input dimensions have not been derived, then the intermediate representation can consist of both the individual multiplications and the loop and can include an additional control structure to decide whether to implement individual multiplications or a loop of a singular multiplication. This control structure operates to evaluate the number of elements and then chooses a logical branch of execution with the individual multiplications or the loop accordingly.

The additional control structure can be included in the generated code, which can be represented in Java, C, C#, C++, TLC, Verilog or VHDL and can be evaluated during execution of the code. Alternatively, a reference to the content of the desired logical branch can be derived before or during execution and then can be used for future computations. The reference can eliminate the need for repeated evaluation of the control structure.

One skilled in the art will recognize that the intermediate representation of graphical model elements can include aspects that can be resolved subsequent to the generation of the intermediate representation. Further, one skilled in the art will recognize that the generated code can include decision logic to capture a functionality of the model elements in the generated code and that an additional layer of redirection may be employed to facilitate efficient evaluation once the necessary information is available.

In addition, one skilled in the art will recognize that many data and model characteristics can have a dedicated IR, such as, for example, for a specific data type of an input, and in particular fixed point. Further, it will be recognized by those in the art that an IR can have different evaluation branches for, but not limited to, a complexity of input data and vectorized parameters of a functionality that is implemented; whether the input is in contiguous memory, whether the output needs to be in contiguous memory, or whether the input consists of a frame of consecutive sampled data values.

As discussed above, the illustrative embodiments allow for the generation of an IR for data and/or model characteristic propagation. The IR for propagation allows data and/or model characteristics to propagate through an element of a block diagram or through an entire block diagram. The propagation of data and/or model characteristics can be performed using an IR prior to or after the compilation of an element and/or a block diagram.

Figure 14:
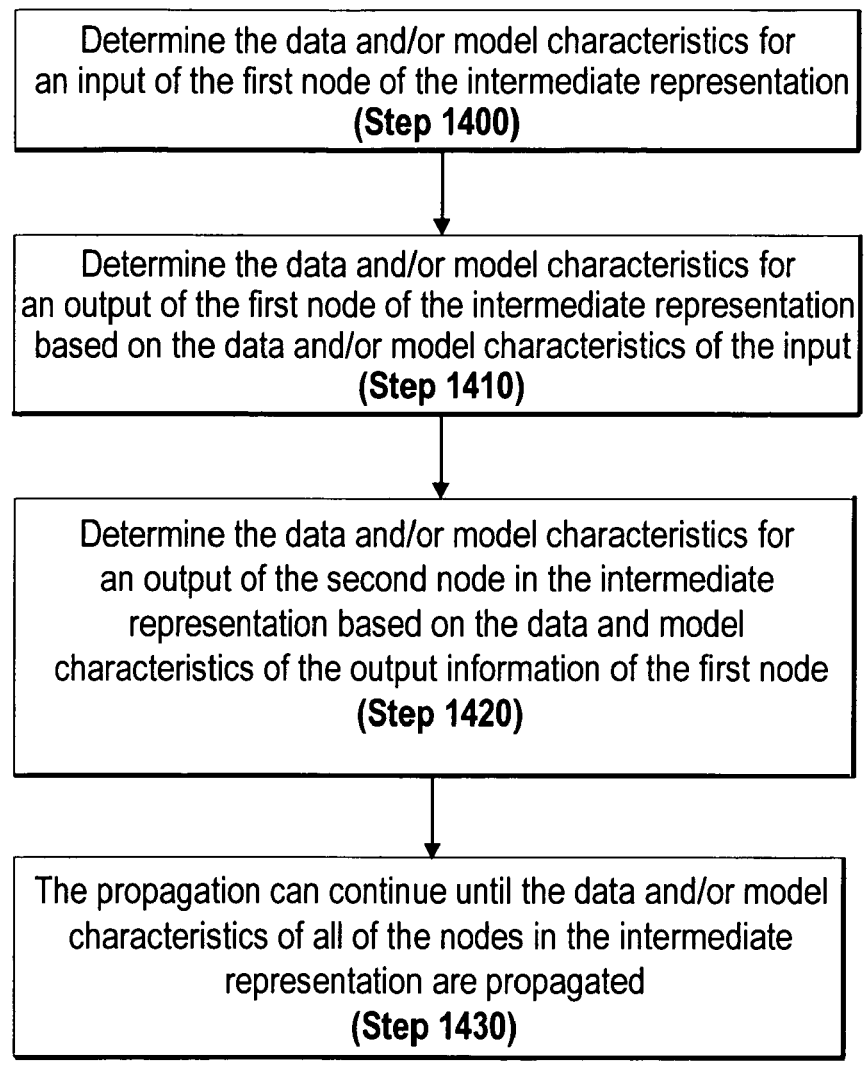
FIG. 14 depicts a flow diagram that illustrates the steps implemented by the illustrative embodiment to enable propagation of data and/or model characteristics.

FIG. 14 is a flow diagram that illustrates the steps implemented by the illustrative embodiment to enable propagation of data and/or model characteristics. The propagation unit 145 determines the data and/or model characteristics for an input of the first node of the IR (step 1400). The propagation unit 145 determines the data and/or model characteristics for an output of the first node of the IR based on the data and/or model characteristics of the input to the first node (step 1410). For example, the first node may determine that the input is a data value of the type double and based on this may specify that the output should be a data value of the type double. The propagation unit 145 determines the data and/or model characteristics for an input of the second node in the IR based on the data and model characteristics of the output information of the first node (step 1420). For example, the input of the second node can be specified to match the output of the first, such that the input of the second node is a data value of the type double. The propagation can continue until the data and/or model characteristics of all of the nodes in the IR are propagated (step 1430). As another example, a node may represent a multiplication operation and may propagate an output data value of type double to request the input data types to be of value double as well.

Figure 15:
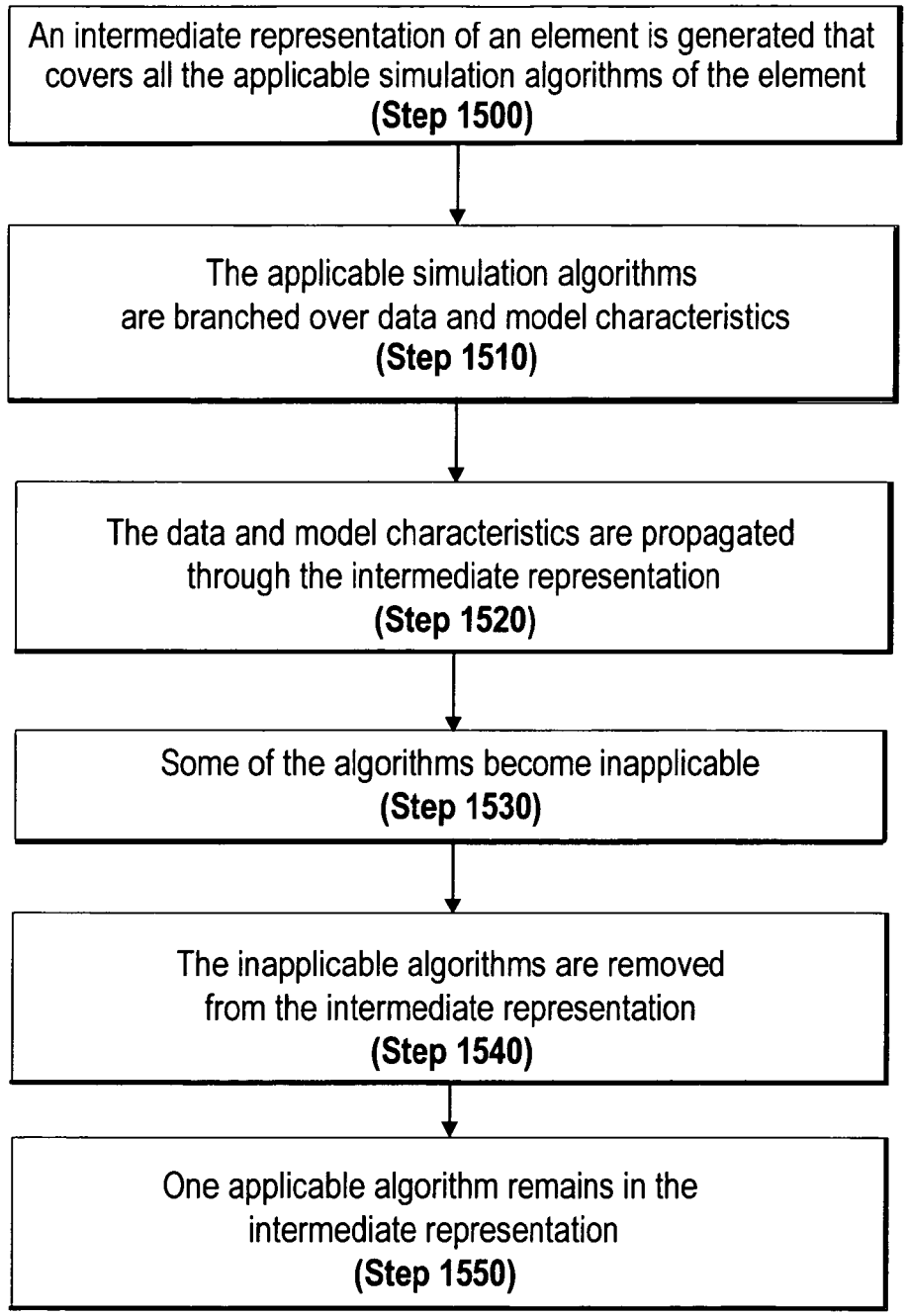
FIG. 15 depicts a flow diagram illustrating the steps for propagation when algorithms that are dependent on data and/or model characteristics are present.

In some cases, there may be elements in a block diagram whose algorithms are dependent on data and/or model characteristics. FIG. 15 is a flow diagram that depicts the steps for propagation when algorithms that are dependent on data and/or model characteristics are present. For example, an element in a block diagram might have different simulation algorithms depending on its sample time being discrete or continuous. In one example, an IR of an element is generated that covers all the applicable simulation algorithms of the element (step 1500). The applicable simulation algorithms are branched over data and model characteristics (step 1510). With all data and model characteristics known, a user can select the only one applicable simulation algorithm. The data and model characteristics are propagated through the IR (step 1520), and some of the algorithms become inapplicable (step 1530). The transformer 170 removes the inapplicable algorithms from the IR (step 1540). After propagation, only one applicable algorithm remains in the IR (step 1550).

Figure 16:
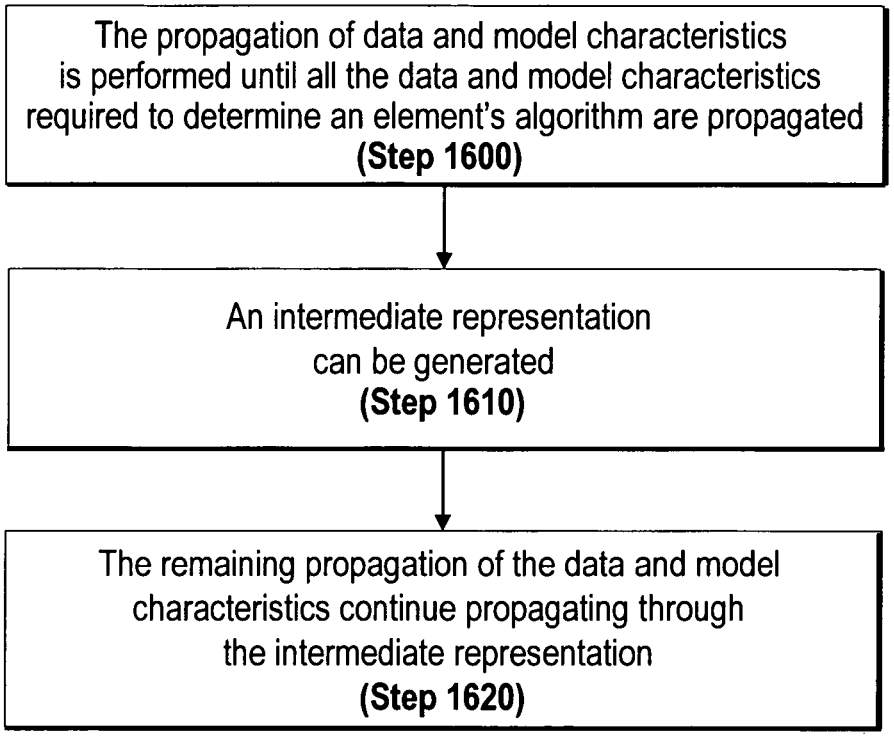
FIG. 16 depicts a flow diagram of another example of the steps performed when algorithms that are dependent on data and/or model characteristics are present.

FIG. 16 is a flow diagram that depicts another example of the steps performed when algorithms that are dependent on data and/or model characteristics are present. The propagation of data and/or model characteristics is performed until all the data and model characteristics required to determine an element's algorithm are propagated (step 1600). Subsequently, an IR can be generated (step 1610) and the remaining propagation of the data and model characteristics can be continued by propagating the IR (step 1620).

Figure 17:
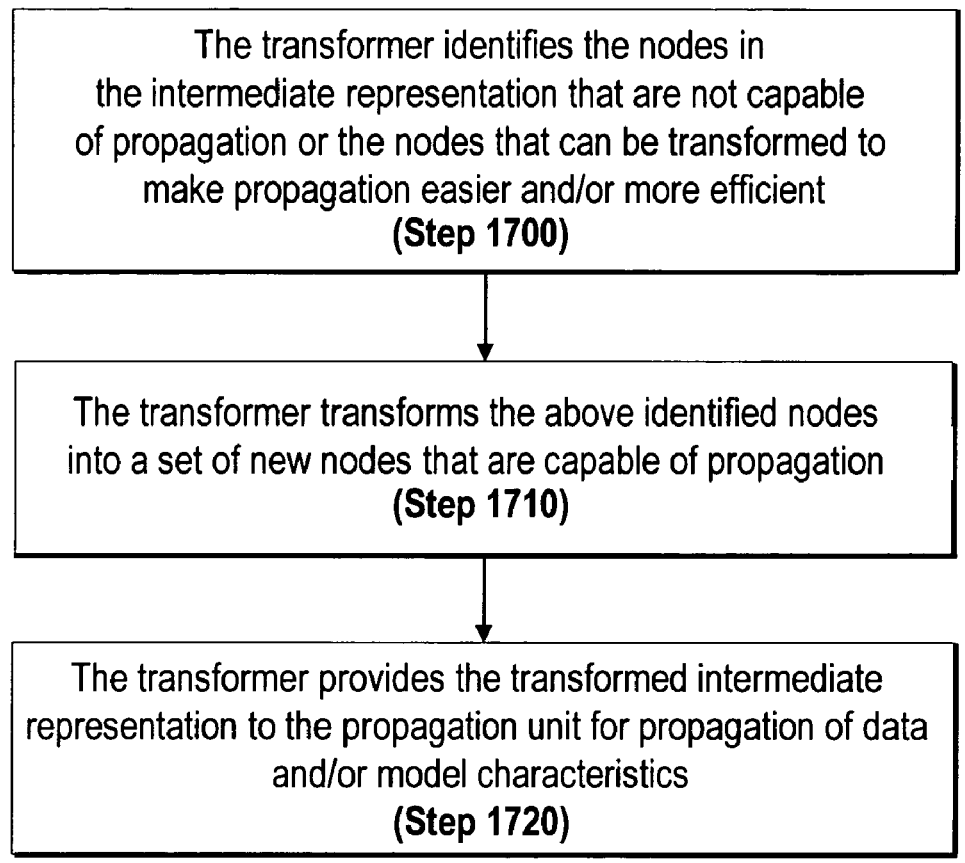
FIG. 17 depicts a flow diagram that illustrates the steps performed to generate a second intermediate representation for propagation.

To enable propagation in some instances or to make the propagation more efficient, a first IR is used to propagate data and/or model characteristics. In some cases, the first IR may not be capable of propagating all of data and/or model characteristics or it may be more efficient to reduce the first IR. To continue propagating the data and/or model characteristics the first IR can be used to generate a second IR that is capable of propagation of data and/or model characteristics that could not be propagated in the first IR. FIG. 17 is a flow diagram that illustrates the steps performed to generate a second IR for propagation. To achieve this, the transformer 170 identifies the nodes in the IR that are not capable of propagation or the nodes that can be transformed to make propagation easier and/or more efficient (step 1700). The transformer 170 transforms the above identified nodes into a set of new nodes that are capable of propagation (step 1710). The transformer 170 provides the transformed IR to the propagation unit 145 for propagation of data and/or model characteristics (step 1720).

The illustrative embodiment of the present invention also provides generating an IR based on an element in a block diagram or a block diagram in a graphical modeling environment. The IR is capable of propagation and simulation with dynamically typed signals. One example of dynamically typed signals is a signal that may determine and change its dimensions, complexity, and/or data type during execution.

Figure 18:
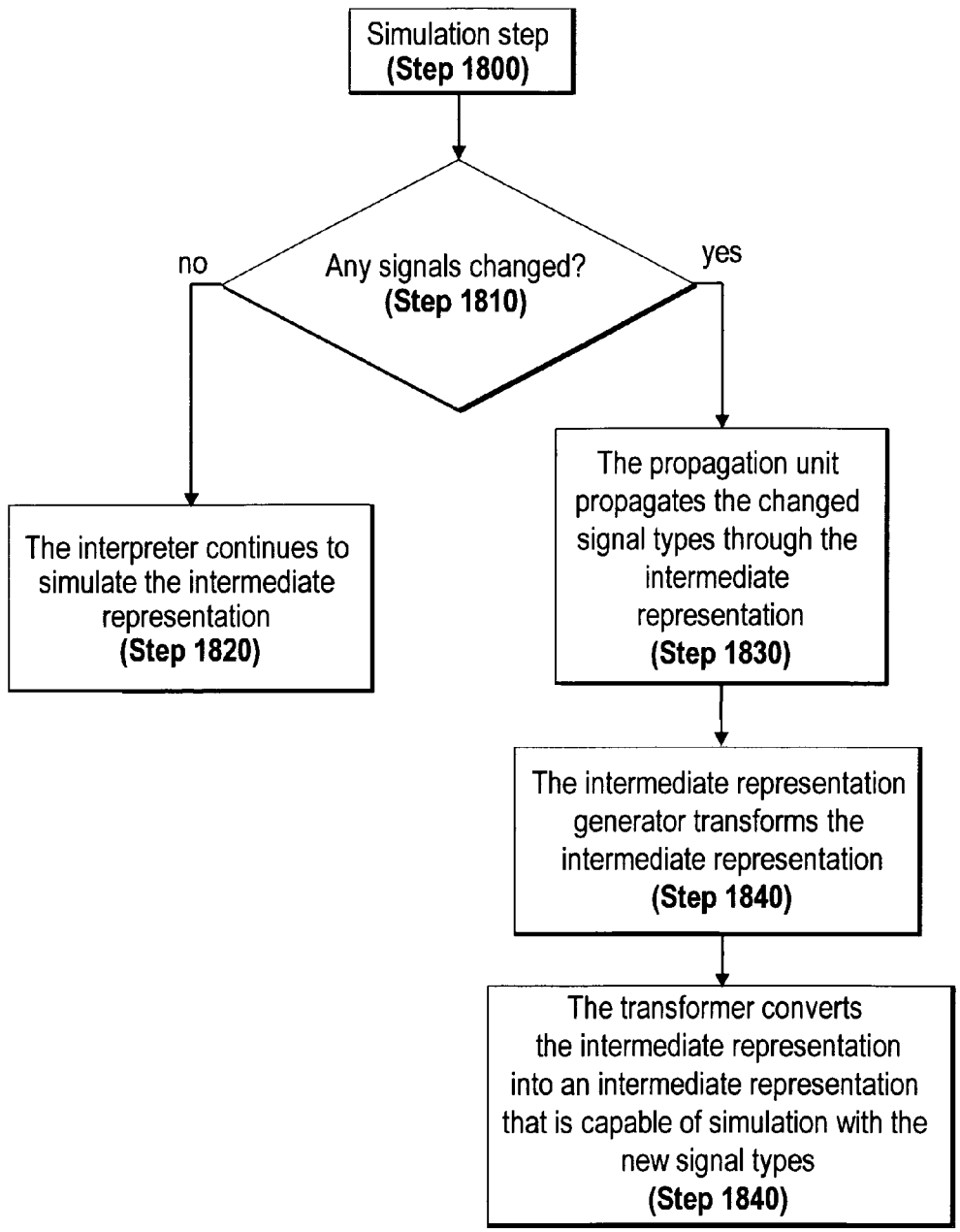
FIG. 18 depicts a flow diagram that illustrates the steps performed when dynamically typed signals are present.

FIG. 18 is a flow diagram that illustrates the steps performed when dynamically typed signals are present. At each simulation step (step 1800), the propagation unit 145 checks if any signal in the IR has been changed (step 1810). If no signal has its type changed (step 1810), the interpreter 175 continues to simulate the IR (step 1820). Otherwise, the propagation unit 145 propagates the changed signal types through the IR (step 1830). For example, a simulation operation that receives a two dimensional input signal can change to an output of the simulation operation to one dimensional signal. Upon the change, the propagation unit 145 updates the output dimension from two dimensions to one dimension. The propagation unit 145 may also involve memory allocation to accommodate the expanded signal sizes.

After propagation of the dynamically typed signals through the IR, the IR generator 165 may transform the IR (step 1840). The transformer 170 converts the IR into a second IR that is capable of simulation with the new signal types (step 1850). For example, a simulation operation that only handles signals of floating-point data types now has a fixed-point data type signal as input, then the transformer 170 needs to replace the simulation operation with a simulation operation that can handle fixed-point data types.

The dispatcher 185 may further analyze the IR and identify the simulation operations that can be replaced with more efficient simulation operations. The dispatcher 185 replaces the identified simulation operations with the dispatched simulation operations. The step for implemented by the dispatcher 185 are discussed with reference to FIG. 8.

The just-in-time compiler 190 may further analyze the IR and identify the simulation operations that are suitable for translation into native machine code. The just-in-time compiler 190 translates the identified simulation operations into native machine code. The steps implemented by the just-in-time compiler 190 are discussed with reference to FIG. 9.

The IR generator 165 may also transform the IR in a way that the simulation operations in the IR can handle most signal types so that the signal type changes may result in minimum efforts of transforming the IR further.

Figure 19:
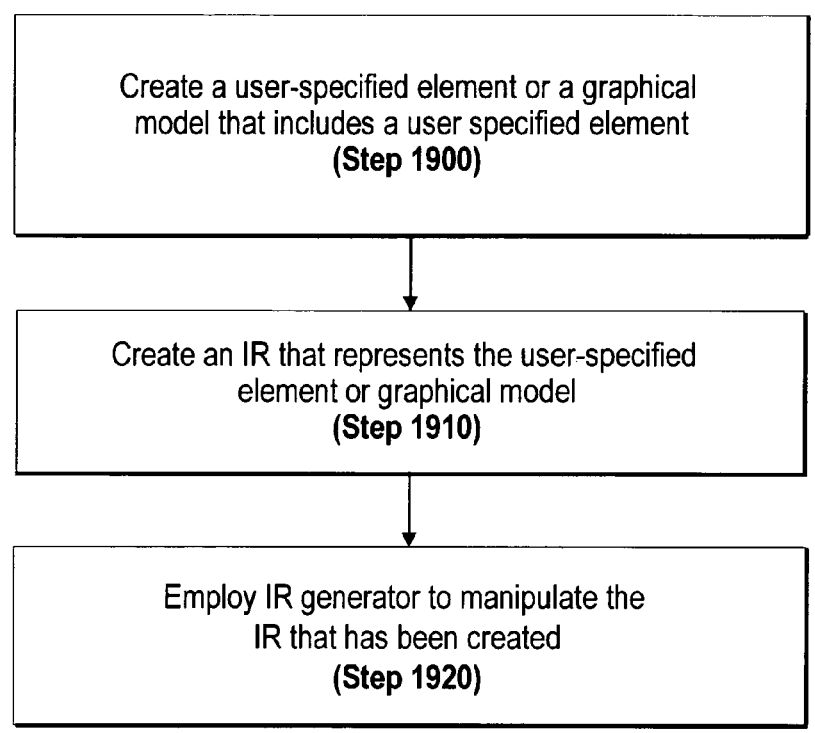
FIG. 19 depicts a flow diagram of the steps for implementing a user-specified intermediate representation.

The illustrative embodiment also enables a user to develop a user-specified IR for a user-specified element and enables a user to replace an IR of a predefined element. FIG. 19 is a flow diagram of the steps for implementing a user-specified IR. A user can create a user-specified element or a block diagram that includes a user specified element (step 1900). The user can then create an IR that represents the user-specified element or block diagram (step 1910). The user can employ the IR generator 165 as described herein to manipulate the IR that has been created by the user (step 1920). In one example, the user can use the dispatcher 185 to programmatically identify the simulation operations that can be replaced with more efficient simulation operations, as depicted in FIG. 8. In another example, the user may also use the just-in-time compiler 190 to programmatically identify the simulation operations that are suitable for translation into native machine code, as depicted in FIG. 9. The user may also use the accelerator, as depicted in FIG. 7.

Figure 20A:
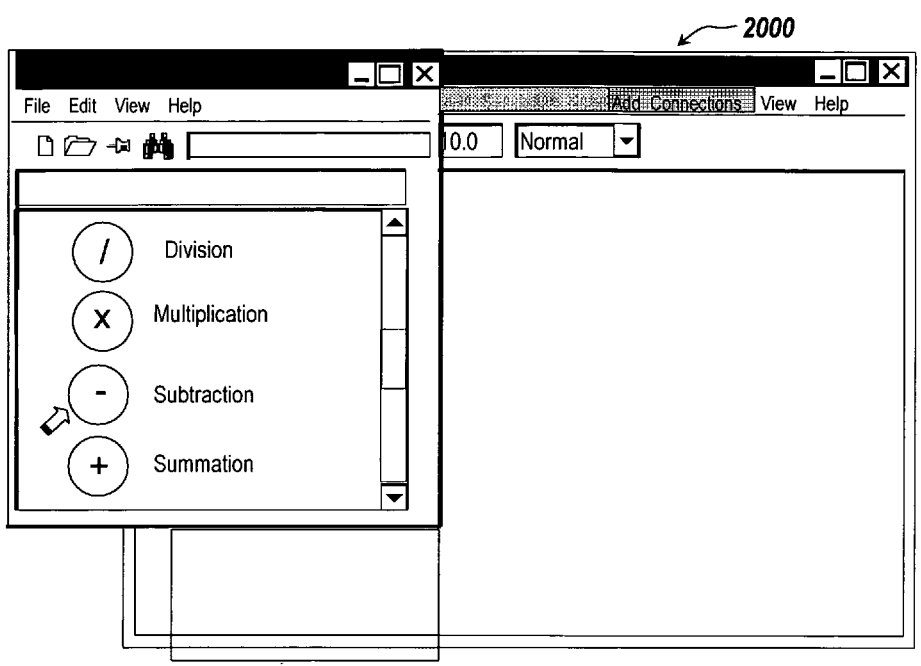
FIG. 20A is an example of a graphical modeling environment that includes an intermediate representation developer.
Figure 20B:
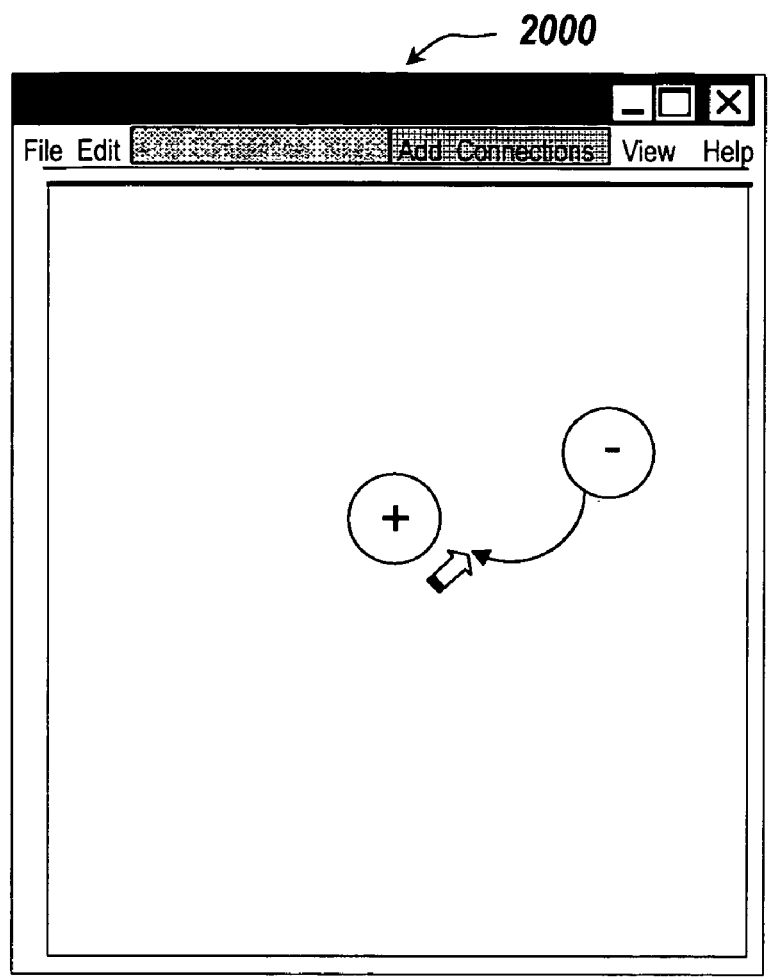
FIG. 20B depicts an example of the intermediate representation developer with simulation nodes added.
Figure 21:
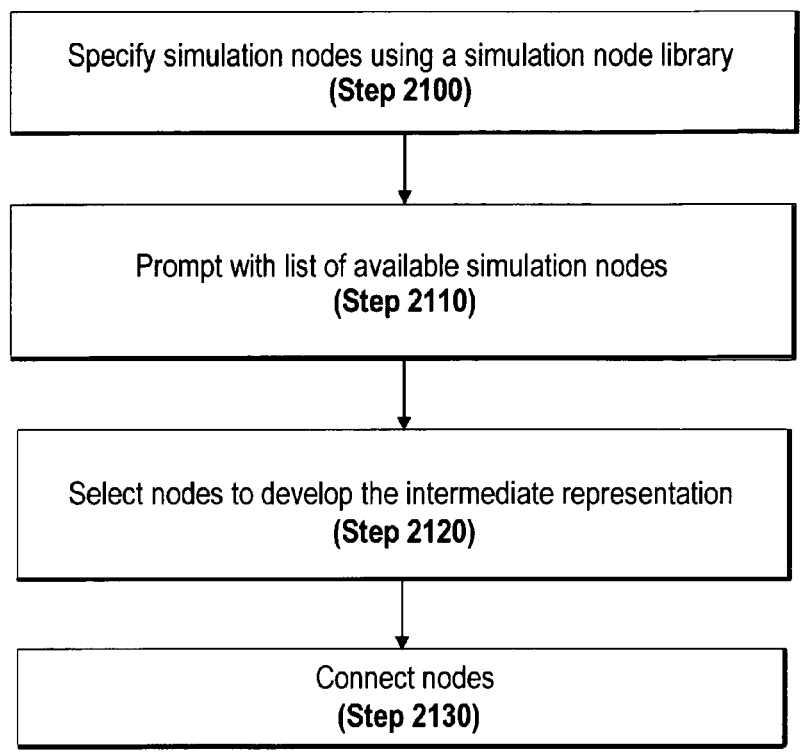
FIG. 21 is a flow graph that depicts the steps to developing a user-specified intermediate representation.

To enable a user to specify an IR, the illustrative embodiment provides an IR developer. FIG. 20A is an example of a graphical modeling environment that includes an IR developer 2000. FIG. 21 is a flow graph that depicts the steps to developing a user-specified IR. The user can specify simulation nodes using a simulation node library (step 2100). For example, the use can select an "add simulation node" button from the menu bar. Upon selecting the "add simulation node" button, the user is prompted with list of available simulation nodes that can be used to form an IR (step 2110). The user can select these nodes to develop the IR (step 2120). FIG. 20B depicts the IR developer 2000 that includes two simulation nodes that have been added by the user. The IR developer also allows a user to connect the simulation nodes added by selecting the "make connection" button. After selecting the "make connection" button the user can draw a line connecting the simulation operations (step 2130). The user can continue this process until the IR is complete. The IR developer 200 can also enable a user to define graph rewriting operations, as discussed above with reference to FIG. 5B. An example of the IR developer 2000 can be a modified version of Simulink®.

The IR that is developed can be used for code generation and may generate code in a programming language, such as Java, C, C#, or C++ or may generate a hardware description language representation in, for example, VHDL and Verilog. The code generation may also produce code to be used by a Target Language Compiler (TLC). For example, a TLC can be provided with the Simulink® product family to enable the creation of "active scripts" that control how the generated code is produced for a block diagram. Using a TLC, one can tailor the generated code to suit specific needs.

Each IR discussed herein can go through a series of optimizations. In one example, an IR may be optimized by using, for example, expression folding, inlining, loop unrolling, and constant propagation. Expression folding refers to reducing multiple expressions to a single expression. In another example, the number of expressions in an IR can be expanded. In this case, the expanded expressions of the IR can be executed in parallel. Complicated expression may also be expanded, such as an iterator, into many simpler equations that are equivalent. As a result of the optimizations that can be performed, the time necessary to execute the IR can be reduced. Further, the optimizations may reduce the memory size of the IR, the memory size of the code that is generated from the IR, and the stack size needed to execute the IR or generated code.

Further, each IR discussed herein can coincide with an IR format that is generated by a C, C#, C++, or Java compiler. In this manner, a binary executable or byte code representation can be immediately generated since the compiler does not have to do any of the parsing and construction of an in-memory representation.

The present invention will be described above relative to certain exemplary embodiments to provide an overall understanding of the principles of the structure, function, manufacture, and use of the instruments disclosed herein. Those skilled in the art will appreciate that the present invention may be implemented in a number of different applications and embodiments and is not specifically limited in its application to the particular embodiments depicted herein. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

What is claimed is:

1. In a graphical modeling environment, a method comprising:
    converting, using a processor, a model of a system to a first intermediate representation that captures one or more operations associated with the model;
    converting the first intermediate representation into a second intermediate representation that is capable of being executed by a simulator, the first intermediate representation, the second intermediate representation, and the model being different representations of the system, the converting of the first intermediate representation into the second intermediate representation including:
        identifying one or more operations captured in the first intermediate representation that are not supported by the simulator,
        converting the identified one or more operations not supported by the simulator into one or more operations that are supported by the simulator, and
        capturing the converted one or more operations in the second intermediate representation; analyzing, using a dispatcher, the second intermediate representation to identify one or more operations and replacing the identified one or more operations with one or more operations selected to achieve a desired objective; and
    simulating the model by executing the second intermediate representation using the simulator.

2. The method of claim 1, wherein the first intermediate representation is a control flow graph.

3. The method of claim 2, wherein the control flow graph comprises a plurality of simulation nodes, a simulation node comprising a basic operation that is executable and wherein simulating further comprises calling the simulation node in the control flow graph and executing the basic operation of the simulation node.

4. The method of claim 1, wherein at least one of the first intermediate representation or the second intermediate representation is a data flow graph.

5. The method of claim 1, wherein the second intermediate representation is a data flow graph that includes a node, the node being associated with an operation that is executable and wherein simulating further comprises:
    calling the node in the data flow graph and executing the operation associated with the node.

6. The method of claim 1, further comprising:
    generating a third intermediate representation for code generation from at least one of the first intermediate representation or the second intermediate representation.

7. The method of claim 1, further comprising:
    generating code based on at least one of the first intermediate representation or the second intermediate representation, the code being represented in at least one of C, C++, C#, Java, VHDL, Verilog, or a target language compiler (TLC).

8. The method of claim 1, wherein one or more of the operations, captured in at least one of the first intermediate representation or the second intermediate representation, include at least one mathematical operation.

9. The method of claim 1, further comprising:
    analyzing the second intermediate representation to determine if the second intermediate representation may be optimized; and
    optimizing the second intermediate representation based on the analyzing.

10. The method of claim 1, wherein the first intermediate representation comprises one or more predefined simulation operations and wherein converting the first intermediate representation into the second intermediate representation further comprises:
    generating, dynamically, a more efficient simulation operation to replace at least one of the predefined simulation operations.

11. The method of claim 1, wherein simulating further comprises:
    executing the second intermediate representation using a just in time (JIT) compiler.

12. The method of claim 1, wherein the first intermediate representation comprises one or more predefined simulation operations and wherein converting the first intermediate representation into the second intermediate representation further comprises:
    replacing one or more predefined simulation operations in the first intermediate representation with more efficient predefined simulation operations.

13. The method of claim 1 further comprising:
    identifying one or more portions of the second intermediate representation that are suitable for translating into code;
    translating the identified one or more portions of the second intermediate representation into code; and
    executing the code during the simulating.

14. The method of claim 1, wherein at least one of the first intermediate representation or the second intermediate representation comprises one or more dynamically typed signals.

15. The method of claim 1, wherein the method further comprises:
    propagating at least one of data or a model characteristic using the second intermediate representation.

16. The method of claim 1, wherein at least one of the first intermediate representation or the second intermediate representation coincides with an intermediate representation implemented by at least one of a C, C++, or Java compiler.

17. The method of claim 1, wherein at least one of the first intermediate representation or the second intermediate representation is capable of dynamically changing.

18. The method of claim 1, wherein the method further comprises:
dynamically changing at least one of the first intermediate representation or the second intermediate representation after a structure of a captured operation changes.

19. The method of claim 1, wherein the method further comprises:
dynamically changing at least one of the first intermediate representation or the second intermediate representation when debugging the model.

20. The method of claim 1, wherein the model includes at least one of a block diagram model or a state diagram model.

21. The method of claim 1, wherein the model includes at least one of a textual element or a graphical element.

22. The method of claim 1, wherein at least one of the first intermediate representation or the second intermediate representation captures an algorithmic aspect of the model.

23. The method of claim 1, wherein the model includes one or more elements and wherein the method further comprises:
computing one or more parameters for one or more elements in the model using at least one of the first intermediate representation or the second intermediate representation.

24. A system comprising:
a model of a system, the model having two or more elements;
a first intermediate representation of the two or more elements, the first intermediate representation capturing one or more operations associated with at least two elements in the model; and
a processor for:
identifying one or more underlying operations captured in the first intermediate representation that are not supported by a simulator,
converting the identified one or more underlying computations into one or more computations that are supported by the simulator,
capturing the converted one or more computations in a second intermediate representation, the first intermediate representation, the second intermediate representation, and the model being different representations of the system, analyzing, using a dispatcher, the second intermediate representation to identify one or more operations and replacing the identified one or more operations with one or more operations selected to achieve a desired objective; and
directing the simulator to simulate at least a portion of the model by executing the second intermediate representation.

25. The system of claim 24, wherein the first intermediate representation or the second intermediate representation is a control flow graph that is capable of being simulated, the control flow graph comprising a plurality of simulation nodes, a simulation node comprising a basic operation that is executable and the simulator being capable of calling the simulation node in the control flow graph and executing the basic operation of the simulation node.

26. The system of claim 24, wherein the second intermediate representation is for code generation, the second intermediate representation being generated from the first intermediate representation.

27. The system of claim 24, wherein the system further comprises a propagation unit for propagating at least one of data or model characteristics with the first intermediate representation or the second intermediate representation.

28. The system of claim 24, wherein the second intermediate representation is generated based on the first intermediate representation.

29. The system of claim 24, wherein the first intermediate representation or the second intermediate representation comprises dynamically typed signals.

30. The system of claim 24, wherein the processor further:
propagates at least one of data or a model characteristic of at least one element in the model.

31. The system of claim 24, wherein the system further comprises a user interface for allowing a user to develop an intermediate representation for at least one of a user-specified element or developing a graph rewriting formula.

32. A non-transitory medium for use on a computing device, the non-transitory medium holding instructions executable using the computing device, the instructions for:
converting two or more elements of a graphical model of a system to a first intermediate representation, the first intermediate representation being a data structure that captures operations associated with the at least two elements;
converting the first intermediate representation into a second intermediate representation that is capable of being executed by a simulator, the first intermediate representation, the second intermediate representation, and the model being different representations of the sytem, the converting including:
identifying one or more operations captured in the first intermediate representation that are not supported by the simulator,
converting the identified one or more operations into one or more operations that are supported by the simulator, and
capturing the converted one or more operations in the second intermediate representation; analyzing, using a dispatcher, the second intermediate representation to identify one or more operations and replacing the identified one or more operations with one or more operations selected to achieve a desired objective; and
simulating the at least two elements by executing the second intermediate representation.

33. The non-transitory medium of claim 32, wherein at least one of the first intermediate representation or the second intermediate representation is a control flow graph.

34. The non-transitory medium of claim 32, wherein the second intermediate representation is a control flow graph and wherein the control flow graph comprises a plurality of simulation nodes, a simulation node comprising a basic operation that is executable and wherein simulating further comprises calling the simulation node in the control flow graph and executing the basic operation of the simulation node.

35. The non-transitory medium of claim 32, further holding instructions for:
analyzing the second intermediate representation to determine if the second intermediate representation may be optimized; and
optimizing the second intermediate representation based on the analyzing.

36. The non-transitory medium of claim 32, wherein the converting is performed by employing a graph rewriting rule for converting the first intermediate representation into the second intermediate representation.

37. In a graphical modeling environment, a method comprising:
- converting, using a processor, two or more elements of a block diagram model representing an elemental dynamic system to a first intermediate representation, the first intermediate representation being a simulatable control flow graph that captures operations associated with the at least two elements, the first intermediate representation having at least one of data or a model characteristic, associated with a converted element, that can-not be propagated;
- converting the first intermediate representation to a second intermediate representation that enables propagation of the at least one data or model characteristic that could not be propagated; and
- propagating the at least one data or model characteristics that could not be propagated using the second intermediate representation analyzing, using a dispatcher, the second intermediate representation to identify one or more operations and replacing the identified one or more operations with one or more operations selected to achieve a desired objective.

38. The method of claim 37, wherein the simulatable control flow graph includes a simulation node associated with a basic operation that is executable and wherein the method further comprises calling the simulation node in the simulatable control flow graph and executing the basic operation of the simulation node.

39. The method of claim 37, wherein the first intermediate representation comprises one or more dynamically typed signals.

40. The method of claim 37, wherein the first intermediate representation comprises a plurality of algorithms that are represented as branches in the first intermediate representation.

41. The method of claim 40, further comprising:
- propagating the data and model characteristics until a single simulation algorithm remains applicable; and
- removing the branches that represent the inapplicable simulation algorithms.

42. A non-transitory medium for use on a computing device for providing an element for a block diagram model, the non-transitory medium holding instructions executable using the computing device, the instructions for:
- converting two or more elements of a block diagram model represendting an elemental dynamic system to a first intermediate representation, the first intermediate representation being a simulatable control flow graph that captures operations associated with the at least two elements;
- converting the first intermediate representation to a second intermediate representation that enables propagation of the at least one data or model characteristic that could not be propagated; and
- propagating the at least one data or model characteristics that could not be propagated using the second intermediate representation analyzing, using a dispatcher, the second intermediate representation to identify one or more operations and replacing the identified one or more operations with one or more operations selected to achieve a desired objective.

* * * * *